United States Patent
Yoshizawa et al.

(10) Patent No.: US 7,764,668 B2
(45) Date of Patent: Jul. 27, 2010

(54) SIGNALING GATEWAY FOR MULTIHOP-RELAYING A SIGNALING MESSAGE

(75) Inventors: Masahiro Yoshizawa, Kokubunji (JP); Kazuma Yumoto, Fuchu (JP); Eri Kawai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 989 days.

(21) Appl. No.: 11/316,751

(22) Filed: Dec. 27, 2005

(65) Prior Publication Data

US 2006/0203831 A1 Sep. 14, 2006

(30) Foreign Application Priority Data

Mar. 14, 2005 (JP) ............................. 2005-070239

(51) Int. Cl.
- G06F 15/173 (2006.01)
- H04L 12/66 (2006.01)
- H04M 3/42 (2006.01)

(52) U.S. Cl. ........................ 370/352; 370/401; 370/522; 370/270; 709/238; 379/207.01

(58) Field of Classification Search ......... 370/229–463, 370/522; 709/238; 379/207.01
See application file for complete search history.

(56) References Cited

U.S. PATENT DOCUMENTS

| | | | |
|---|---|---|---|
| 6,252,952 B1 * | 6/2001 | Kung et al. ............... | 379/114.1 |
| 6,826,173 B1 * | 11/2004 | Kung et al. ................ | 370/352 |
| 7,283,519 B2 * | 10/2007 | Girard ......................... | 370/353 |
| 7,386,000 B2 * | 6/2008 | Lopponen et al. .......... | 370/433 |
| 2002/0176404 A1 * | 11/2002 | Girard ......................... | 370/352 |
| 2004/0193725 A1 * | 9/2004 | Costa-Requena et al. ... | 709/238 |
| 2007/0005804 A1 * | 1/2007 | Rideout ...................... | 709/246 |
| 2007/0019545 A1 * | 1/2007 | Alt et al. ..................... | 370/230 |
| 2007/0217407 A1 * | 9/2007 | Yuan et al. .................. | 370/389 |

* cited by examiner

*Primary Examiner*—Ayaz R Sheikh
*Assistant Examiner*—Venkatesh Haliyur
(74) *Attorney, Agent, or Firm*—Stites & Harbison, PLLC; Juan Carlos A. Marquez, Esq.

(57) ABSTRACT

If interaction between signaling gateways frequently occurs, it is possible that extended processings are executed redundantly on a path of signaling messages. To avoid such a redundancy, a consistent method is necessary for deciding a signaling gateway to execute an extended processing from among the signaling gateways. The signaling gateways, each time they receive a signaling message, calculate information about a path through which it is transferred. By passing the path information in addition to the signaling message to an extended processing program, the signaling gateways decide whether to execute the extended processing on the signaling gateways, on a session basis. A signaling gateway that has executed an extended processing adds information indicating a processing status to the signaling message to notify other signaling gateways of it.

7 Claims, 21 Drawing Sheets

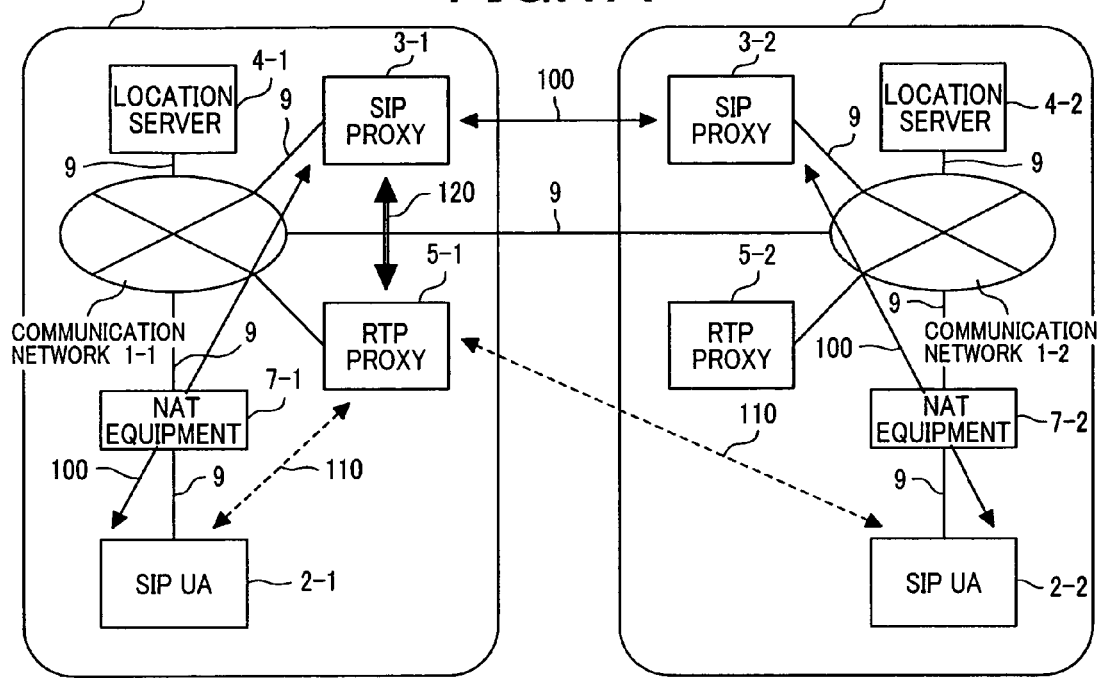
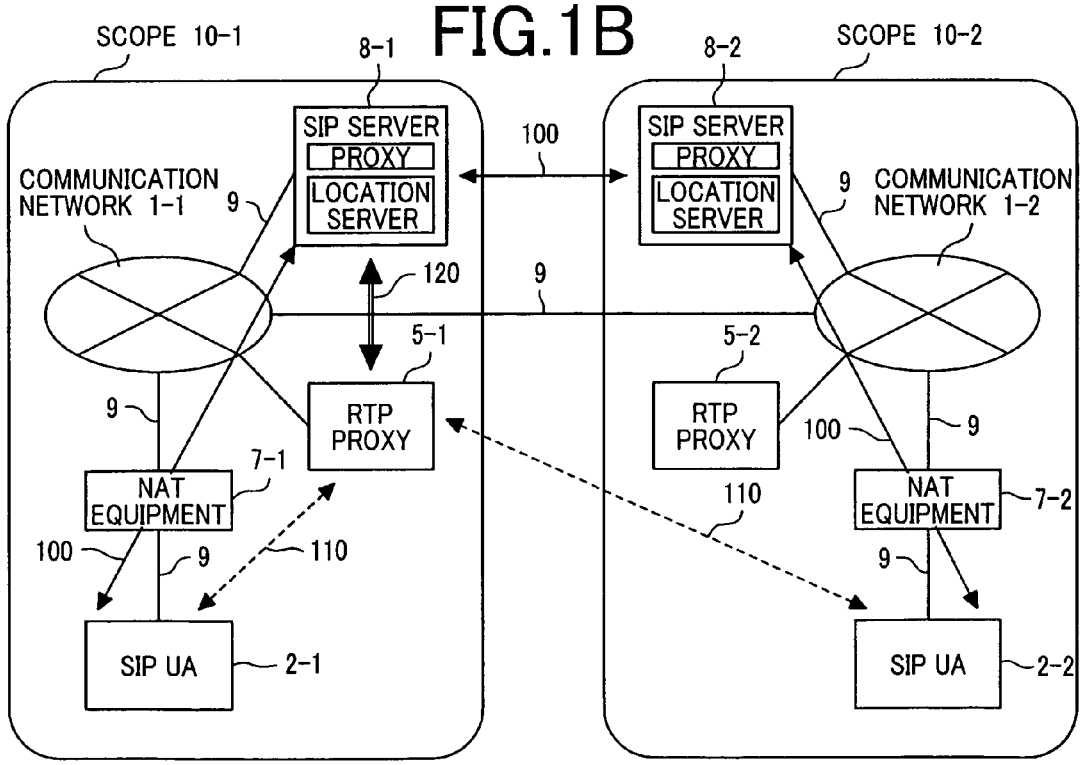

FIG. 20A

```
INVITE sip : bob@biloxi.example.com SIP/2.0
Via: SIP/2.0/TCP ssl.atlanta.example.com:5060 ; branch=z9hG4bK2d4790.1
Via: SIP/2.0/TCP client.atlanta.example.com:5060 ; branch=z9hG4bK74bf9
  ; received=192.0.2.101
Max-Forwards : 69
Record-Route : <sip : ssl.atlanta.example.com ; lr>
From : Alice<sip : alice@atlanta.example.com> ; tag=9fxced76sl
To : Bob<sip : bob@biloxi.example.com>
Call-ID : 3848276298220188511@atlanta.example.com
CSeq : 2 INVITE
Contact : <sip : alice@client.atlanta.example.com ; transport=tcp>
Content-Type : application/sdp
Content-Length : 149
Proxy-Processing : rtp v=0
o=alice 2890844526 2890844526 IN IP4 client.atlanta.example.com
s=-
c=IN IP4 172.16.2.10
t=0 0
m=audio 49172 RTP/AVP 0
a=rtpmap : 0 PCMU/8000
```

FIG. 20B

```
INVITE sip : bob@biloxi.example.com SIP/2.0
Via: SIP/2.0/TCP ssl.atlanta.example.com:5060 ; branch=z9hG4bK2d4790.1
Via: SIP/2.0/TCP client.atlanta.example.com:5060 ; branch=z9hG4bK74bf9
  ; received=192.0.2.101
Max-Forwards : 69
Record-Route : <sip : ssl.atlanta.example.com ; lr>
From : Alice<sip : alice@atlanta.example.com> ; tag=9fxced76sl
To : Bob<sip : bob@biloxi.example.com>
Call-ID : 3848276298220188511@atlanta.example.com
CSeq : 2 INVITE
Contact : <sip : alice@client.atlanta.example.com ; transport=tcp>
Content-Type : multipart/mixed ; boundary="simple boundary"
Content-Length : 302

--simple boundary
Content-Type : application/sdp v=0
o=alice 2890844526 2890844526 IN IP4 client.atlanta.example.com
s=-
c=IN IP4 172.16.2.10
t=0 0
m=audio 49172 RTP/AVP 0
a=rtpmap : 0 PCMU/8000

--simple boundary
Content-Type : application/x-sip-proxy-processing rtp

--simple boundary--
```

SIGNALING GATEWAY FOR MULTIHOP-RELAYING A SIGNALING MESSAGE

CLAIM OF PRIORITY

The present application claims priority from Japanese application JP 2005-070239 filed on Mar. 14, 2005, the content of which is hereby incorporated by reference into this application.

FIELD OF THE INVENTION

The present invention relates to a device and a system that executes extended processings on a path through which signaling messages are transferred, by using signaling gateways for multihop-relaying the signaling messages.

Recently, as a result of widespread use of broadband and an advance in standardization of VoIP (Voice over IP (Internet Protocol)) protocols, IP phones have rapidly come into widespread use. The most popular use of the VoIP protocols is SIP (Session Initiation Protocol) that has been designed taking the characteristics of the Internet into account. There are three components described below in the simplest configuration of SIP. This specification uses definitions below in the description of embodiments.

A first component is SIP UA (User Agent). This is a communication terminal that can interpret SIP messages, which are SIP signaling messages. A second component is a location server. This is a server that manages the correspondences between names (Universal Resource Identifier; URI etc.) representative of SIP UAs and the network addresses of the SIP UAs.

The location server manages SIP UAs and SIP proxies. This specification designates the range of SIP UA and SIP proxies managed by one location server as the "scope" of the location server to differentiate it from a "domain" in DNS (Domain Name System). Although the range of a domain and a scope usually coincides, they may not completely coincide, such as one scope that contains plural domains.

A third component is an SIP proxy. This is a server that transfers an SIP message to a destination SIP UA, based on information on the location server. The SIP proxy need not necessarily transfer the SIP message directly to the destination SIP UA, but may transfer the SIP message to another SIP proxy that is closer to the destination.

An SIP proxy, when receiving an SIP message, sometimes executes extended processings other than the transfer of the SIP message. Such extended processings include interaction with a media relay server such as RTP (Real-Time Transport Protocol) proxy, interaction with a presence server, interaction with Web servers, log recording, recording of accounting information, and QoS (Quality of Service) control. Since SIP was initially devised as a signaling protocol serving as an infrastructure of multimedia communications on the Internet, the SIP proxy can easily execute extended processings in interaction with other servers. However, if the effects of the present invention are secured, extended processings are not limited to those referred to here. The above is an example of extended processing in an SIP proxy. Even in other signaling protocols, signaling gateways exist that execute extended processings other than the transfer of signaling messages.

SUMMARY OF THE INVENTION

The following presents a problem with the execution of extended processings other than the transfer of signaling message in signaling gateways that transfer the signaling messages. Presently, it is rare that a signaling gateway that executes extended processings other than the transfer of signaling messages interacts with signaling gateways managed by other service providers. In future, however, if interaction between signaling gateways frequently occurs because of an increase in the connection between service providers, it is possible that extended processings are executed redundantly on a path of signaling messages, or a necessary extended processing is not executed.

FIG. 21 shows an example that, in SIP, signaling gateways (SIP proxies) interact with media relay servers (RTP proxies) as extended processings. This drawing shows the exchange of a signaling message (SIP message 100) between SIP UA 2-1 and SIP UA 2-2. In this case, an SIP proxy 3-1 interacts with an RTP proxy 5-1 because the SIP UA 2-1 is behind a NAT (Network Address Translation) device 7-1, and an SIP proxy 3-2 interacts with an RTP proxy 5-2 because the SIP UA 2-2 is behind NAT equipment 7-2. Thus, since SIP proxies have no means for obtaining information about extended processings executed by other SIP proxies, they execute redundant RTP proxy interaction that would be enough if executed only once on a path.

Accordingly, to avoid such a redundancy, a consistent method is necessary which can decide which signaling gateway executes an extended processing, among the signaling gateways. The above-mentioned problem is not limited to SIP. As far as the effects of the present invention are secured, an extended processing is not limited to interaction with RTP proxies as shown by the above example.

The present invention has, on a memory of each signaling gateway, a program for calculating information on a path through which signaling messages are transferred, and a program for calculating information on an extended processing required by each user terminal. In addition to the two programs, a program for executing extended processings is stored on the memory of the signaling gateway.

The signaling gateway passes the two above-mentioned pieces of information, in addition to the signaling messages, to the program for executing extended processings, thereby deciding whether to execute the extended processings in the own signaling gateway, on a session basis. The signaling gateway adds information indicating a processing status to the signaling messages to notify other signaling gateways that an extended processing has been executed. Thereby, the above-mentioned object is achieved.

Since the number of executions of an extended processing on a path is minimized, processing loads in the signaling gateways are reduced, and a delay time during transfer of a signaling message is reduced. When a processing in the signaling gateways involves interaction with external servers, it leads to traffic reduction in not only the signaling gateways but also the external servers. In this way, loads on an entire network are reduced.

BRIEF DESCRIPTION OF THE DRAWINGS

FIG. 1A and FIG. 1B are drawings showing a physical configuration of a communication network assumed in a first embodiment;

FIG. 20A and FIG. 20B are drawings showing examples of SIP messages to which processing notification of RTP proxy interaction is added in the first embodiment.

DETAILED DESCRIPTION OF THE PREFERRED EMBODIMENTS

First Embodiment

Figure 2:
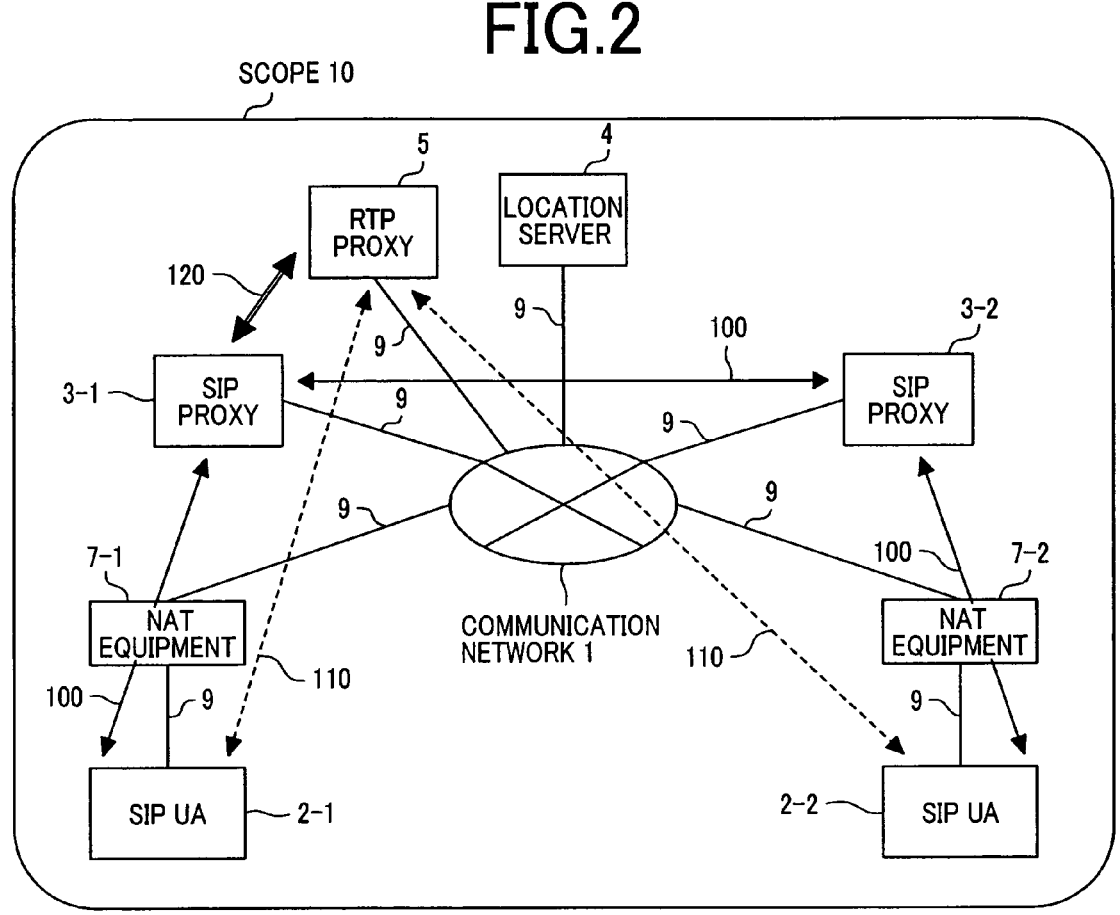
FIG. 2 is a drawing showing a physical configuration of a network assumed in a second embodiment.

Hereinafter, embodiments will be described with reference to the accompanying drawings.

FIG. 1A schematically shows a physical configuration of a communication network assumed in this embodiment. An SIP UA 2-1 may be a mobile terminal such as a cellular phone and a PDA (Personal Digital Assistant), as well as a stationary terminal such as a PC having a communication function and a phone-type terminal. An SIP proxy 3-1 decides a route of an SIP message based on information managed by a location server 4-1, and transfers the message. Like an SIP server 5-1 of FIG. 1B, the SIP proxy and the location server may be integrated. The SIP UA 2-1, NAT equipment 7-1, the SIP proxy 3-1, the location server 4-1, and an RTP proxy 5-1 are mutually connected through physical communication lines 9. The SIP UA 2-1 is indirectly connected with a communication network 1-1 through the NAT equipment 7-1. The SIP UA 2-1 can transmit and receive SIP messages only via the SIP proxy 3-1. They belong to the same scope 10-1.

An SIP UA 2-2, NAT equipment 7-2, an SIP proxy 3-2, a location server 4-2, and an RTP proxy 5-2 in a scope 10-2 are mutually connected through physical communication lines 9 like the scope 10-1. The SIP UA 2-2 is indirectly connected with a communication network 1-2 through the NAT equipment 7-2. The SIP UA 2-2 can transmit and receive SIP messages only via the SIP proxy 3-2.

The communication network 1-1 and the communication network 1-2 are connected through the physical communication lines 9. The scope 10-1 is simply a range managed by the location server 4-1, and the scope 10-2 is simply a range managed by the location server 4-2; the range of a scope is not necessarily limited by physical positions. In the drawings, however, to ease understanding, the range of a scope are made to coincide with physical positions on a communication network.

Location servers in the first embodiment to fourth embodiment manage information about an extended processing requested by each SIP UA within its own scope, in addition to information managed by conventional location servers. In the first embodiment, the location server 4-1 manages information that "SIP UA 2-1 requests RTP proxy interaction", and the location server 4-2 manages information that "SIP UA 2-2 requests RTP proxy interaction".

The RTP proxy in the first, second, and fourth embodiments execute simple a processing that, on receiving an identifier (Call-ID, etc.) uniquely identifying a session from the SIP proxy, the RTP proxy newly allocates a port number corresponding to the session if not allocated, and sends the port number back to the SIP proxy.

In the first embodiment, a session is established between the SIP UA 2-1 and the SIP UA 2-2. Thin solid lines 100 show the flow of an SIP message when a session is established between the SIP UA 2-1 and the SIP UA 2-2. In this embodiment, the SIP UA 2-1 is a caller (SIP UA that transmits INVITE), and the SIP UA 2-2 is a callee. Broken lines 110 show the flow of an RTP stream.

Figure 5:
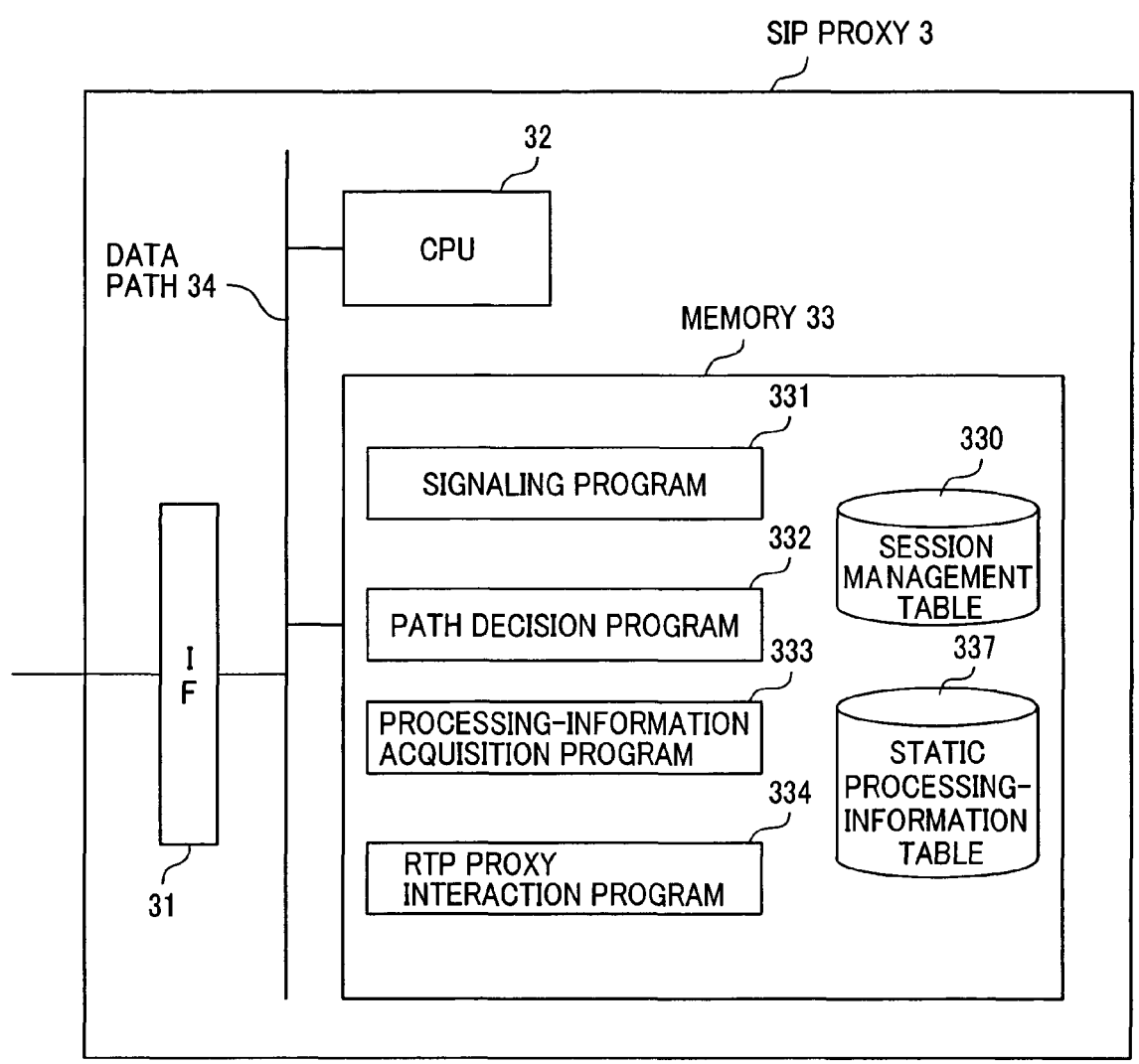
FIG. 5 is a block diagram showing functional expansion of an internal configuration of an SIP proxy in the first and second embodiments.

FIG. 5 is a block diagram showing functional expansion of an internal configuration of the SIP proxy 3 (common to the SIP proxy 3-1 and the SIP proxy 3-2) shown in FIG. 1A. The SIP proxy 3 transmits and receives SIP messages through an IF 31. Programs of the SIP proxy 3 are stored in a memory 33. During operation, a CPU 32 reads them through a data path 34 to execute them. Tables managed by the SIP proxy 3 are stored in the memory 33, and necessary information is taken from the tables and written in. These tables may be stored in a DB device such as hard disk that is realized in a storage system.

The memory 33 stores a session management table 330, a signaling program 331, a path decision program 332, a processing-information acquisition program 333, an RTP proxy interaction program 334, and a static processing-information table 337. The session management table 330 is a table that stores information about a session that the SIP proxy 3 is currently concerned in. The information includes a status of each session, the identifier of the session, and the URI and contact address of a caller and a callee. In this patent, the session management table 330 stores, in addition to the information managed by normal SIP proxies, "path type", "previous hop", "next hop", and information about an extended processing having been executed in the session.

A path type, which indicates characteristics of an entire path, is a path closed within one scope (hereinafter referred to as "closed") or a path extending to two or more scopes (hereinafter referred to as "open"). The type is decided from URI included in From header of an SIP message (hereinafter referred to as caller URI) and URI included in To header (hereinafter referred to as callee URI).

A previous hop refers to a transmitting source of an SIP message to the SIP proxy 3. It falls into three categories: SIP UA belonging to the same scope as the SIP proxy 3 (hereinafter referred to as same-scope UA); other SIP proxy belonging to the same scope as the SIP proxy 3 (hereinafter referred to as same-scope SIP proxy); and SIP proxy belonging to a scope different from the SIP proxy 3 (hereinafter referred to as other-scope SIP proxy). To which of the categories a previous hop belongs is decided from NNI (Network-Network Interface) or UNI (User-Network Interface) used by the SIP proxy 3 to receive the SIP message.

A next hop refers to the next destination to which the SIP proxy 3 is to transmit an SIP message. It falls into three categories: same-scope UA, same-scope SIP proxy, and other-scope SIP proxy. To which of the categories a next hop belongs is decided from a callee URI.

Information about extended processings having been executed in the session indicates "execute" or "not execute" of an extended processing in the SIP proxy 3. Its usage will be described later. In the first to fourth embodiments below, the session management table 330 has, in addition to an area for storing the above-mentioned information, an area for caching a caller's or callee's (or both) information acquired from the location server 4. However, such a cache is not mandatory in the present invention.

The signaling program 331 executes basic operations on SIP messages. The signaling program 331 provides the same functions as existing SIP proxies, except that it calls the path decision program 332, the processing-information acquisition program 333, and the extended processing program (RTP proxy interaction program 334, and presence server interaction program 335 in and after the third embodiment, etc.).

The path decision program 332 calculates information on a path through which a signaling message is transferred. The program calculates a path type, a previous hop, and a next hop of the path through which the SIP message is transferred.

The processing-information acquisition program 333 calculates information about extended processings required by each SIP UA. The information includes dynamic information and static information. The former is information that differs for each SIP UA, for example, information such as "SIP UA X requests RTP proxy interaction (because it is behind NAT equipment)". The latter is information common to SIP UAs within a scope, for example, information such as "if an SIP UA within the scope starts a call, its status is automatically updated to "busy"".

The RTP proxy interaction program 334, which executes a extended processing, receives calculation results of the path decision program 332 and the processing-information acquisition program 333, and only when specific conditions are satisfied, executes SIP proxy-RTP proxy interaction (hereinafter referred to as RTP proxy interaction). The RTP proxy interaction refers to the operation that requests an RTP proxy to allocate a port number, and modifies the contents of an SDP (Session Description Protocol) message by using the allocated port number so that an RTP packet exchanged between SIP UAs passes through the RTP proxy without fail.

The static processing-information table 337 stores information common to all SIPUAs within a scope, of information about extended processings required by the SIP UAs. In the first and second embodiments, the table may contain no information. As described above, since a program that calculates information necessary to determine whether to execute extended processings is separated from a program that executes extended processings, the program that executes extended processings can be easily added or deleted without modifying programs that exist originally in a signaling gateway.

Figure 16:
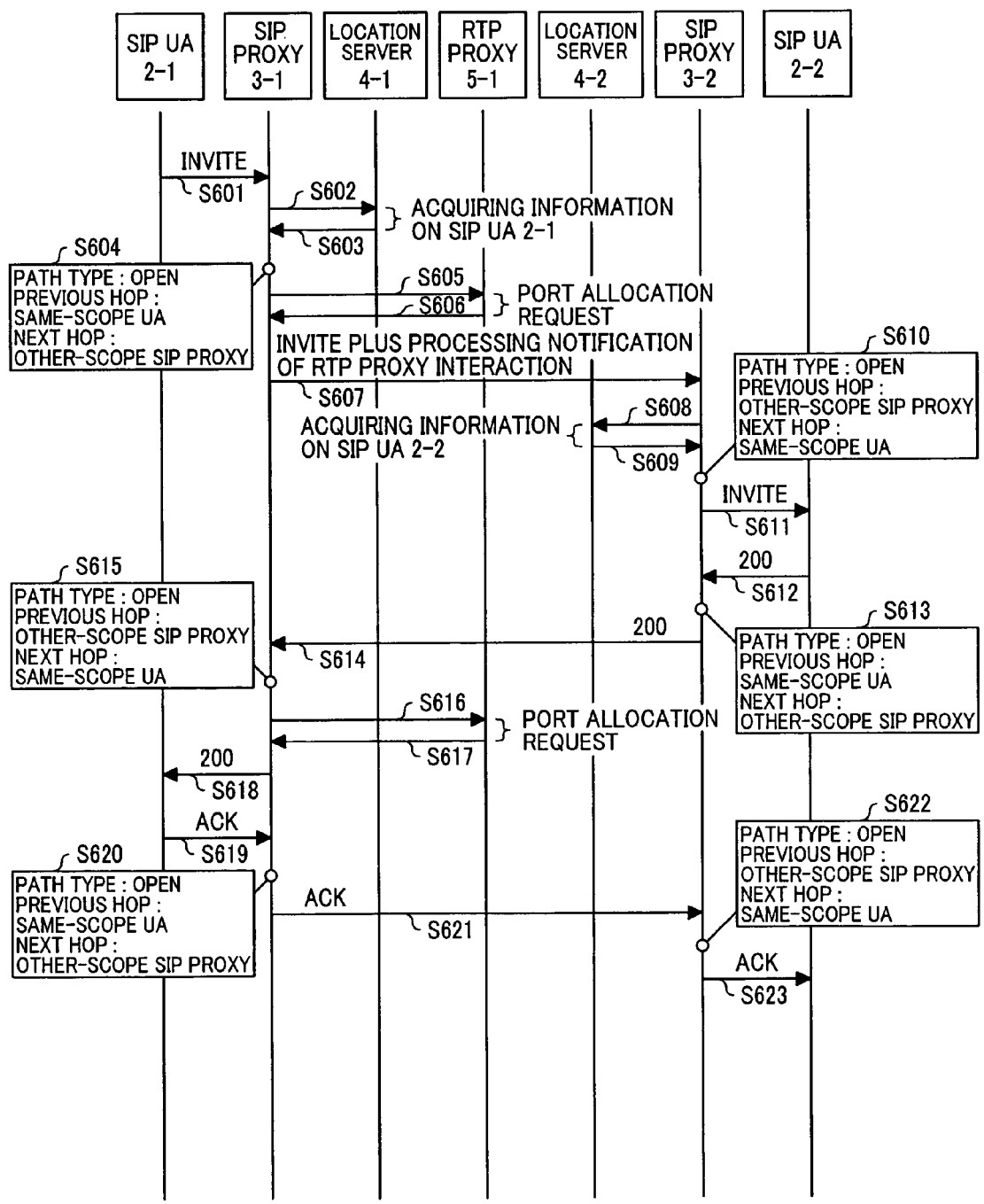
FIG. 16 is a drawing showing an operation sequence of the first embodiment.

FIG. 16 is a sequence diagram showing an example of the operation of establishing a session between the SIP UA 2-1 and the SIP UA 2-2. Hereinafter, with reference to the sequence diagram shown in FIG. 16 and flowcharts shown in FIGS. 8 to 13, a description will be made of the process in which an SIP proxy to execute RTP proxy interaction is dynamically decided when an SIP message passes through plural SIP proxies.

When the SIP proxy 3-1 receives INVITE (S601) containing SDP from the SIP UA 2-1, the INVITE is passed to the signaling program 331. The signaling program 331 calls the path decision program 332 in the processing.

The path decision program 332 determines whether the SIP message is a request (S101), and when a request, determines whether it is ACK (S102). In this case, since the request is INVITE, it sets the path type to "closed" (S103). Then, it determines whether UA corresponding to a caller URI (hereinafter referred to as caller UA) is a same-scope UA or other-scope UA, from a domain of the caller URI and the like (S104). Since the SIP UA 2-1 and the SIP proxy 3-1 belong to the same scope (S105), it acquires information on the caller UA from the location server 4-1 (S106). Likewise, it determines whether UA corresponding to the callee URI (hereinafter referred to as callee UA) is a same-scope UA or other-scope UA (S108). Since the SIP UA 2-2 and the SIP proxy 3-1 belong to different scopes (S109), it sets the path type to "open" (S111).

Next, the path decision program 332 determines whether the request has been received via UNI or NNI (S117). This determination is made by determining whether the transmission address of INVITE is registered in advance as NNI. Since the transmission address of INVITE is SIP UA 2-1, it sets the caller UA (same-scope UA) to the previous hop (S119).

Since it has been determined from the result of S108 that the callee UA is not a same-scope UA (S121), the path decision program 332 sets the SIP proxy 3-2 that can transfer INVITE to the SIP UA 2-2 (other-scope SIP proxy), to the next hop (S125). As information specific to the session, the path decision program 332 registers information (S604) on path type, previous hop, and next hop in the session management table (S126). Aside from the path type and other information, it registers the cache of information acquired from the location server in the session management table (S127). The path decision program 332 returns the information obtained as described above to the signaling program 331.

Upon termination of the path decision program 332, the signaling program 331 calls the processing-information acquisition program 333. The processing-information acquisition program 333 acquires the cache of information on SIP UA belonging to the same scope from the session management table (this is the cache registered in S127). Although cache is used in this embodiment, the location server may be accessed again when cache is not used. An exclusive server to store dynamic information on extended processings may be accessed if it exists aside from the location server. If throughput is emphasized, cache is used, while if emphasis is placed on saving a memory and a disk area on the SIP proxy, it is desirable to use the location server and the exclusive server.

In this example, since the caller UA is a same-scope UA (S201), the processing-information acquisition program 333 acquires processing information on the caller UA (S202), and since the callee UA is other-scope UA (S203), it executes no special processing. Then, it acquires common processing information within the same scope from the static processing-information table (S205). In the first embodiment, since the static processing-information table 337 contains no information, no static information can be acquired. The processing-information acquisition program 333 returns dynamic information that "Caller UA requests RTP proxy interaction" that has been obtained as mentioned above to the signaling program 331.

The signaling program 331 calls the RTP proxy interaction program 334. When the signaling program 331 calls an extended processing program such as the RTP proxy interaction program 334, it passes a calculation result received from the path decision program 332 and the processing-information acquisition program 333.

The RTP proxy interaction program 334 checks whether the previous hop or the next hop is a same-scope UA (S301). In this example, since the previous hop is a same-scope UA, it checks whether the caller UA or callee UA requests RTP proxy interaction (S302). In this example, it proceeds to the next processing because the information acquired from the location server 4-1 in S106 indicates that the SIP UA 2-1 being a caller UA requests RTP proxy interaction.

In this example, the received SIP message is INVITE (S304) and contains SDP (S305). Therefore, it checks whether the path type is "open" (S315). Since the path type is "open ", it checks whether processing notification of RTP proxy interaction is contained in the SIP message (S316). Since the previous hop is a same-scope UA (SIP UA 2-1), processing notification of RTP proxy interaction is not contained in the SIP message. The above is a processing condition judgment part of the RTP proxy interaction program 334. The RTP proxy interaction program 334 executes such processing condition judgment in order that the same programs can be used also in network configurations of other than this embodiment.

After that, the RTP proxy interaction program 334 analyzes the content of SDP (S320), and sends a port allocation request to the RTP proxy (S321). The RTP proxy 5-1 newly allocates a port number to a session identifier (S605) contained in the port allocation request, and returns the port number as a response (S606). The RTP proxy interaction program 334 modifies the SDP message based on the port number (S322). It records information indicating that RTP proxy interaction has been executed in the session, in the session management table 330 (S323). Such recording of executions will contribute to simplification of computation at subsequent reception of SIP messages (2xx, ACK, etc.) concerning the session.

Since the path type is "open" (S324), it adds processing notification of RTP proxy interaction to the SIP message (S325). It is necessary to explicitly notify SIP proxies belonging to different scopes that RTP proxy interaction has already been executed.

FIG. 20 shows an example of the addition. In the example of FIG. 20A, a character string "rtp" is stored in a proxy-processing header originally defined to indicate that RTP proxy interaction has already been executed. Without defining a new header exclusively used for processing notification, such a character string may be stored as one of parameters of a header defined with a different intention.

In an example of FIG. 20B, a character string "rtp" is stored in a body of "application/x-sip-proxy-processing", which is Content-Type originally defined, to indicate that RTP proxy interaction has already been executed (in this example, since SDP already exists, the body is made into multipart). Without defining a new body of Content-Type exclusively used for processing notification, such a character string may be stored as part of a body of Content-Type defined with a different intention.

In addition to the information indicating that RTP proxy interaction has been executed, more detailed information on RTP proxy interaction (domain name of RTP proxy, etc.) may be stored in the above-mentioned area. The above is a processing part of the RTP proxy interaction program 334. Upon termination of the above processing, the signaling program 331 transfers INVITE to the SIP proxy 3-2 (S607).

When the SIP proxy 3-2 receives INVITE (S607) containing SDP from the SIP proxy 3-1, the INVITE is passed to the signaling program 331. The signaling program 331 calls the path decision program 332 in the processing.

The path decision program 332 determines whether the SIP message is a request (S101), and when a request, determines whether it is ACK (S102). After that, unlike the case of the SIP proxy 3-1, since the SIP UA 2-1 and the SIP proxy 3-2 belong to different scopes (S105), it sets the path type to "open" (S107). Since the SIP UA 2-2 and the SIP proxy 3-2 belong to the same scope (S109), it acquires information on the callee UA from the location server 4-2 (S110).

Next, the path decision program 332 determines whether the request has been received via UNI or NNI (S117). It sets the SIP proxy 3-1 (other-scope SIP proxy) that transmitted the INVITE, to the previous hop (S120).

Since it has been determined from the result of S108 that the callee UA is a same-scope UA (SIP UA 2-2) (S121), the path decision program 332 determines whether the SIP proxy 3-2 can transmit the SIP message directly to the SIP UA 2-2. Since it can be directly transmitted, the path decision program 332 sets the same-scope UA to the next hop (S123). As information specific to the session, the path decision program 332 registers information (S610) on path type, previous hop, and next hop in the session management table (S126). Aside from the path type and other information, it registers information acquired from the location server in the session management table (S127). The path decision program 332 returns the information obtained as described above to the signaling program 331.

Upon termination of the path decision program 332, the signaling program 331 calls the processing-information acquisition program 333. The processing-information acquisition program 333, in contrast to the case of the SIP proxy 3-1, returns dynamic information that "callee UA requests RTP proxy interaction" to the signaling program 331.

The signaling program 331 calls the RTP proxy interaction program 334. When the signaling program 331 calls an extended processing program such as the RTP proxy interaction program 334, it passes a calculation result received from the path decision program 332 and the processing-information acquisition program 333.

The RTP proxy interaction program 334 proceeds to its middle part like when the SIP proxy 3-1 receives INVITE. In this example, however, since processing notification of RTP proxy interaction has been added to INVITE by the SIP proxy 3-1, it is determined in S316 that processing notification of RTP proxy interaction has been made. Since one execution of RTP proxy interaction on the path is sufficient, it can be determined by the processing notification that the SIP proxy 3-2 does not need to execute RTP proxy interaction. This prevents superfluous extended processings from being executed on the path of the SIP message.

The RTP proxy interaction program records information indicating that RTP proxy interaction has not been executed, in the session management table 330 (S317), and terminates. Such recording of non-executions will contribute to simplification of computation at subsequent reception of SIP messages (2xx, ACK, etc.) concerning the session.

Upon termination of the above processing, the signaling program 331 transfers INVITE to the SIP UA 2-2 (S611). Since the SIP proxy 3-2 knows at this time that the next hop is a same-scope UA, to prevent information about processings in the network from propagating to the SIP UA, processing notification of RTP proxy interaction may be deleted from INVITE.

Assume that the SIP UA 2-2 receives INVITE, then responds with 200 (S612) containing SDP. When the SIP proxy 3-2 receives the 200, the 200 is passed to the signaling program 331. The signaling program 331 calls the path decision program 332 in the processing.

When the SIP message is a response, the path decision program 332 uses the information at the time of the request. It acquires the path type, previous hop, and next hop at the request of the session from the session management table (S112). It sets path type to that at the request (S113), sets previous hop and next hop reversely to those at the request (S114), and returns obtained information (S613) to the signaling program 331.

Upon termination of the path decision program 332, the signaling program 331 calls the processing-information acquisition program 333. The processing-information acquisition program 333 returns to the signaling program 331 the same information when the SIP proxy 3-2 receives INVITE.

The signaling program 331 calls the RTP proxy interaction program 334. The RTP proxy interaction program 334 checks whether the previous hop or the next hop is a same-scope UA (S301). In this example, since the previous hop is a same-scope UA, it checks whether the caller UA or callee UA requests RTP proxy interaction (S302). In this example, since it is known that the SIP UA 2-2 being a callee UA requests RTP proxy interaction, it proceeds to the next processing.

In this example, since the received SIP message is 200 (S304), the RTP proxy interaction program 334 acquires information on the session from the session management table 330 (S306). In this example, the SIP message is not ACK (S307), SDP is received through INVITE of the session (S308), and 200 contains SDP (S313). However, since the SIP proxy 3-2, at the time of reception of INVITE, records non-execution of the RTP proxy interaction in the session management table (S326), the processing terminates without executing RTP proxy interaction. Upon termination of the above processing, the signaling program 331 transfers 200 to the SIP proxy 3-1 (S614).

When the SIP proxy 3-1 receives the 200 (S614) containing SDP from the SIP proxy 3-2, the 200 is passed to the signaling program 331. The signaling program 331 calls the path decision program 332 in the processing. When the SIP message is a response, the path decision program 332 uses the information at the time of the request. It acquires the path type, previous hop, and next hop at the request of the session from the session management table (S112). It sets path type to that at the request (S113), sets previous hop and next hop reversely to those at the request (S114), and returns obtained information (S615) to the signaling program 331.

Upon termination of the path decision program 332, the signaling program 331 calls the processing-information acquisition program 333. The processing-information acquisition program 333 returns to the signaling program 331 the same information when the SIP proxy 3-1 receives INVITE.

The signaling program 331 calls the RTP proxy interaction program 334. The RTP proxy interaction program 334 proceeds to its middle part like when the SIP proxy 3-2 receives 200. However, since the SIP proxy 3-1 has recorded the execution of RTP proxy interaction in the session management table when receiving INVITE (S326), it continues the processing.

The RTP proxy interaction program 334 analyzes the content of SDP as at the reception of INVITE (S327), and sends a port allocation request to the RTP proxy (S328). The RTP proxy 5-1 sees a session identifier contained in the port allocation request (S616), and returns the same port number as allocated previously (S605, S606) as a response (S617). The RTP proxy interaction program 334 modifies the SDP message based on the port number (S329).

Upon termination of the above processing, the SIP proxy 3-1 transfers 200 to the SIP UA 2-1 (S618). In this way, among SIP proxies existing in the path of the SIP message, SIP proxies that execute RTP proxy interaction can be uniquely decided.

As a result, since the exchange of message 120 between the SIP proxies and the RTP proxies decreases, a delay time during SIP message transfer is reduced. Since the number of RTP proxies that relay an RTP stream 110 is reduced, a delay time of voice and moving images is reduced. Moreover, a reduction in the amount of processing for SIP messages and RTP streams will contribute to a reduction in loads on RTP proxies.

Second Embodiment

In the first embodiment, an example is shown that an SIP message passes through a path extending to plural scopes. When SIP proxies of such different scopes interact with each other, explicit processing notification of extended processings has been required.

However, when an SIP message passes through a path closed to one scope, without transmitting and receiving explicit processing notification of extended processings, it is possible for the SIP proxies to implicitly know that an extended processing has already been executed. Accordingly, in this embodiment, operation in such a case will be described.

FIG. 2 shows a physical configuration of a network assumed in this embodiment. SIP UAs 2-1 and 2-2 are the same as those in the first embodiment. SIP proxies 3-1 and 3-2 decide a path of an SIP message to transfer it, based on information managed by a location server 4. A communication network 1, SIP UAs 2-1 and 2-2, NAT equipment 7-1 and 7-2, SIP proxies 3-1 and 3-2, a location server 4, and an RTP proxy 5 are mutually connected via physical communication lines 9. The SIP UAs 2-1 and 2-2 are indirectly connected with the communication network 1 via the NAT equipment 7-1 and 7-2, respectively. The SIP UAs 2-1 and 2-2 can transmit and receive SIP messages only via the SIP proxies 3-1 and 3-2, respectively. These belong to the same scope 10.

The scope 10 is simply a range managed by the location server 4; the range of a scope is not necessarily limited by physical positions. In the drawings, however, to ease understanding, the range of a scope is made to coincide with physical positions on a communication network.

In the second and fourth embodiments, as information on an extended processing requested by each SIP UA, the location server 4 manages information that "SIP UA 2-1 requests RTP proxy interaction", and information that "SIP UA 2-2 requests RTP proxy interaction". In the second embodiment, a session is established between the SIP UA 2-1 and the SIP UA 2-2. Thin solid lines 100 show the flow of an SIP message when a session is established between the SIP UA 2-1 and the SIP UA 2-2. In this embodiment, the SIP UA 2-1 is a caller (SIP UA that transmits INVITE), and the SIP UA 2-2 is a callee. Broken lines 110 show the flow of an RTP stream. The internal configurations of the SIP proxies 3 (3-1, 3-2) and flowcharts of programs of the SIP proxies are the same as those in the first embodiment.

By the way, the RTP proxy interaction program of this embodiment follows a policy that the first SIP proxy that can execute RTP proxy interaction executes RTP proxy interaction. However, when an SIP message passes through a path closed to one scope, an RTP proxy interaction program may be created that follows a different policy, for example, a policy that executes RTP proxy interaction when it can be executed and the next hop is SIP UA. However, on a path of an SIP message, an SIP proxy may exist that cannot execute RTP proxy interaction due to temporary trouble or the like. Therefore, it is desirable to follow the policy of this embodiment in terms of measures against trouble.

Figure 17:
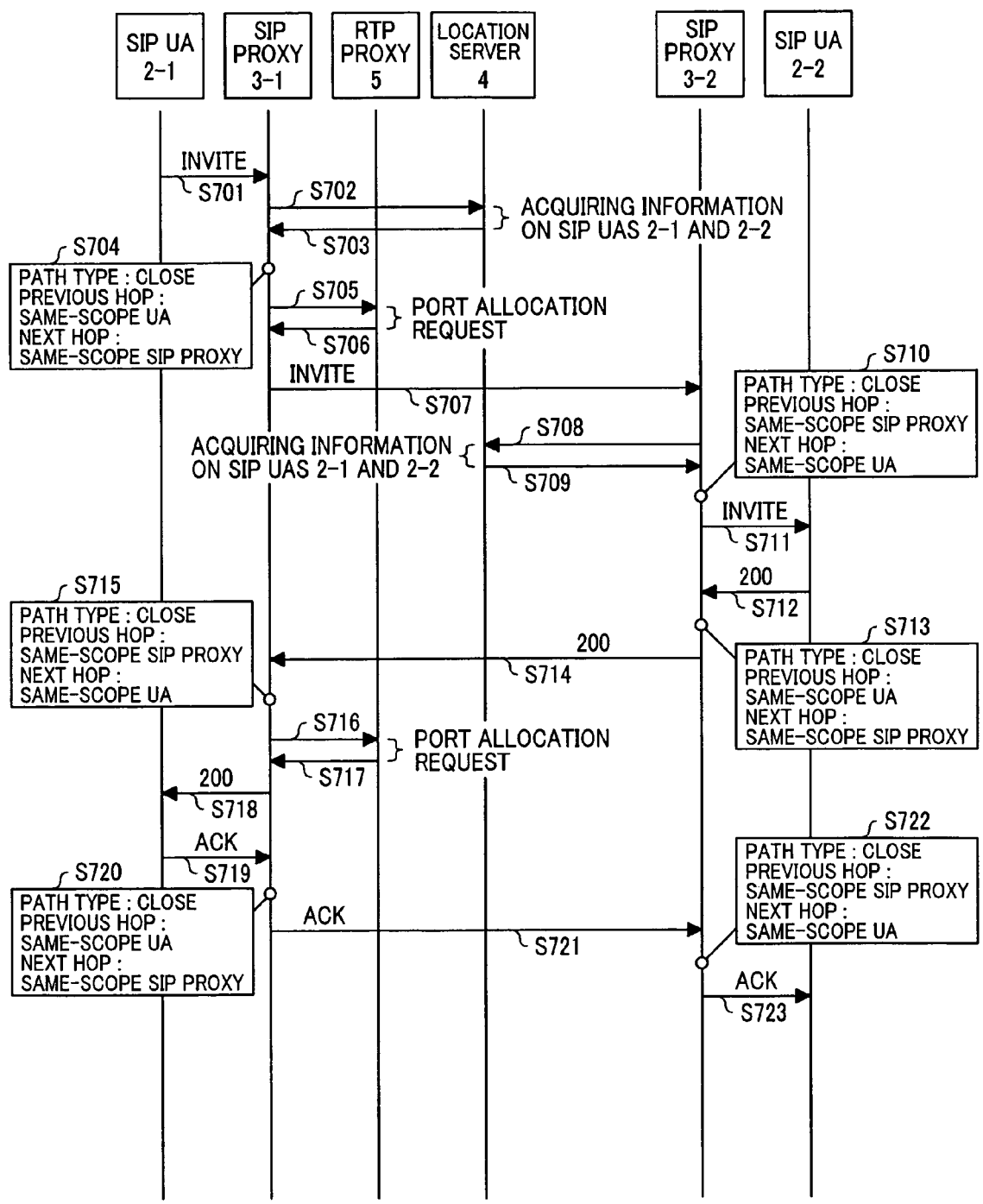
FIG. 17 is a drawing showing an operation sequence of the second embodiment.

FIG. 17 is a sequence diagram showing an example of the operation of establishing a session between the SIP UA 2-1 and the SIP UA 2-2. Hereinafter, with reference to the sequence diagram shown in FIG. 17 and flowcharts shown in FIGS. 8 to 13, a description will be made of the process in which an SIP proxy to execute RTP proxy interaction is dynamically decided when an SIP message passes through plural SIP proxies.

When the SIP proxy 3-1 receives INVITE (S701) containing SDP from the SIP UA 2-1, the INVITE is passed to the signaling program 331. The signaling program 331 calls the path decision program 332 in the processing.

The path decision program 332 determines whether the SIP message is a request (S101), and when a request, determines whether it is ACK (S102). In this case, since the request is INVITE, it sets the path type to "closed" (S103). Then, it determines whether a caller UA is a same-scope UA or other-scope UA (S104). Since the SIP UA 2-1 and the SIP proxy 3-1 belong to the same scope (S105), it acquires information on the caller UA from the location server 4 (S106). Likewise, it determines whether a callee UA is a same-scope UA or other-scope UA (S108). Since the SIP UA 2-2 and the SIP proxy 3-1 belong to the same scope (S109), it acquires information on the callee UA from the location server 4 (S110).

Next, the path decision program 332 determines whether the request has been received via UNI or NNI (S117). This determination is made by determining whether the transmission address of INVITE is registered in advance as NNI. Since the transmission address of INVITE is SIP UA 2-1, it sets the caller UA (same-scope UA) to the previous hop (S119).

It is understood from the information acquired from the location server 4 in S110 that the SIP proxy 3-1 belongs to the same scope as the callee UA (S121) but cannot directly transfer the SIP message (S122). Accordingly, the path decision program 332 sets to the next hop the SIP proxy 3-2 (same-scope SIP proxy) that can transfer INVITE to the SIP UA 2-2 (S124). As information specific to the session, it registers information (S704) on path type, previous hop, and next hop in the session management table (S126). Aside from the path type and other information, it registers the cache of information acquired from the location server in the session management table (S127). The path decision program 332 returns the information obtained as described above to the signaling program 331.

Upon termination of the path decision program 332, the signaling program 331 calls the processing-information acquisition program 333. The processing-information acquisition program 333 acquires the cache of information on SIP UA belonging to the same scope from the session management table (this is the cache registered in S127). Although cache is used in this embodiment, the location server may be accessed again when cache is not used. An exclusive server to store dynamic information on extended processings may be accessed if it exists aside from the location server. If throughput is emphasized, cache is used, while if emphasis is placed on saving a memory and a disk area on the SIP proxy, it is desirable to use the location server and the exclusive server.

In this example, since both the caller UA and the callee UA are same-scope UAs (S201, S203), the processing-information acquisition program 333 acquires their respective processing information (S202, S204). Then, it acquires common processing information within the same scope from the static processing-information table (S205). In the second embodiment, since the static processing-information table 337 contains no information, no static information can be acquired. The processing-information acquisition program 333 returns dynamic information that "Caller UA and callee UA request RTP proxy interaction" obtained as mentioned above to the signaling program 331.

The signaling program 331 calls the RTP proxy interaction program 334. When the signaling program 331 calls an extended processing program such as the RTP proxy interaction program 334, it passes a calculation result received from the path decision program 332 and the processing-information acquisition program 333.

Up to S315, the RTP proxy interaction program 334 proceeds like when the SIP proxy 3-1 receives INVITE in the first embodiment. However, in the second embodiment, since the path type is "closed", it checks whether the previous hop is a same-scope SIP proxy (S318). In this example, since the previous hop is a same-scope UA (SIP UA 2-1), the program continues processings. The above is a processing condition judgment part of the RTP proxy interaction program 334. The RTP proxy interaction program 334 executes such processing condition judgment in order that the same programs can be used also in network configurations of other than this embodiment.

After that, the RTP proxy interaction program 334 analyzes the content of SDP (S320), and sends a port allocation request to the RTP proxy (S321). The RTP proxy 5-1 newly allocates a port number to a session identifier (S705) contained in the port allocation request, and returns the port number as a response (S706). The RTP proxy interaction program 334 modifies the SDP message based on the port number (S322). It records information indicating that RTP proxy interaction has been executed in the session, in the session management table 330 (S323). Such recording of executions will contribute to simplification of computation at subsequent reception of SIP messages (2xx, ACK, etc.) concerning the session.

Since the path type is "closed" (S324), it does not need to add processing notification of RTP proxy interaction to the SIP message. However, to execute interaction among SIP proxies more strictly, even when the path type is "closed", processing notification of RTP proxy interaction may be added to the SIP message. The above is a processing part of the RTP proxy interaction program 334.

Upon termination of the above processing, the signaling program 331 transfers INVITE to the SIP proxy 3-2 (S707). When the SIP proxy 3-2 receives INVITE (S707) containing SDP from the SIP proxy 3-1, the INVITE is passed to the signaling program 331. The signaling program 331 calls the path decision program 332 in the processing.

Up to S118, the path decision program 332 proceeds like when the SIP proxy 3-1 receives INVITE in this embodiment. However, since the SIP proxy 3-2 receives INVITE from the SIP proxy 3-1, it sets the SIP proxy 3-1 (same-scope SIP proxy) that transmits INVITE, to the previous hop (S120).

Since it has been determined from the result of S108 that the callee UA is a same-scope UA (SIP UA 2-2) (S121), the path decision program 332 determines whether the SIP proxy 3-2 can transmit the SIP message directly to the SIP UA 2-2. Since it is understood from the information acquired from the location server 4 in S110 that the SIP proxy 3-2 can directly transfer the SIP message to the SIP UA 2-2, it sets the SIP UA 2-2 (same-scope UA) to the next hop (S123). As information specific to the session, the path decision program 332 registers information (S710) on path type, previous hop, and next hop in the session management table (S126). Aside from the path type and other information, it registers information acquired from the location server in the session management table (S127). The path decision program 332 returns the information obtained as described above to the signaling program 331.

Upon termination of the path decision program 332, the signaling program 331 calls the processing-information acquisition program 333. The processing-information acquisition program 333 proceeds like when the SIP proxy 3-1 receives INVITE in this embodiment, and returns dynamic information that "caller UA and callee UA request RTP proxy interaction" to the signaling program 331.

The signaling program 331 calls the RTP proxy interaction program 334. When the signaling program 331 calls an extended processing program such as the RTP proxy interaction program 334, it passes a calculation result received from the path decision program 332 and the processing-information acquisition program 333.

The RTP proxy interaction program 334 proceeds to its middle part like when the SIP proxy 3-1 receives INVITE in this embodiment. However, when the path type is "closed" (S315), and the previous hop is a same-scope SIP proxy (S318), it is implicitly understood that an SIP proxy of the previous hop has already executed RTP proxy interaction. Since one execution of RTP proxy interaction on the path is sufficient, it can be determined that the SIP proxy 3-2 does not need to execute RTP proxy interaction. This prevents superfluous extended processings from being executed on the path of the SIP message even when the SIP message passes through a path closed to one scope. The program stores in the session management table 330 the information indicating that RTP proxy interaction has not been executed in the session (S319), and terminates.

However, to execute interaction among SIP proxies more strictly, even when the path type is "closed", RTP proxy interaction may be executed when processing notification of RTP proxy interaction is not made.

Upon termination of the above processing, the signaling program 331 transfers INVITE to the SIP UA 2-2 (S711). Since the SIP proxy 3-2 knows at this time that the next hop is a same-scope UA, to prevent information about processings in the network from propagating to the SIP UA, processing notification of RTP proxy interaction may be deleted from INVITE.

Assume that the SIP UA 2-2 receives INVITE, then responds with 200 (S712) containing SDP. When the SIP proxy 3-2 receives the 200, the 200 is passed to the signaling program 331. The signaling program 331 calls the path decision program 332 in the processing.

When the SIP message is a response, the path decision program 332 uses the information at the time of the request. It acquires the path type, previous hop, and next hop at the request of the session from the session management table (S112). It sets path type to that at the request (S113), sets previous hop and next hop reversely to those at the request (S114), and returns obtained information (S713) to the signaling program 331.

Upon termination of the path decision program 332, the signaling program 331 calls the processing-information acquisition program 333. The processing-information acquisition program 333 returns to the signaling program 331 the same information when the SIP proxy 3-2 receives INVITE.

The signaling program 331 calls the RTP proxy interaction program 334. However, since the SIP proxy 3-2, at the time of reception of INVITE, records non-execution of the RTP proxy interaction in the session management table, the processing terminates without executing RTP proxy interaction (S326). Upon termination of the above processing, the signaling program 331 transfers 200 to the SIP proxy 3-1 (S714).

When the SIP proxy 3-1 receives the 200 (S714) containing SDP from the SIP proxy 3-2, the 200 is passed to the signaling program 331. The signaling program 331 calls the path decision program 332 in the processing. When the SIP message is a response, the path decision program 332 uses the information at the time of the request. It acquires the path type, previous hop, and next hop at the request of the session from the session management table (S112). It sets path type to that at the request (S113), sets previous hop and next hop reversely to those at the request (S114), and returns obtained information (S715) to the signaling program 331.

Upon termination of the path decision program 332, the signaling program 331 calls the processing-information acquisition program 333. The processing-information acquisition program 333 returns to the signaling program 331 the same information when the SIP proxy 3-1 receives INVITE in this embodiment.

The signaling program 331 calls the RTP proxy interaction program 334. Since the SIP proxy 3-1 has recorded the execution of RTP proxy interaction in the session management table when receiving INVITE (S326), it continues the processing.

The RTP proxy interaction program 334 analyzes the content of SDP as at the reception of INVITE (S327), and sends a port allocation request to the RTP proxy (S328). The RTP proxy 5-1 sees a session identifier contained in the port allocation request (S716), and returns the same port number as allocated previously (S705, S706) as a response (S717). The RTP proxy interaction program 334 modifies the SDP message based on the port number (S329).

Upon termination of the above processing, the SIP proxy 3-1 transfers 200 to the SIP UA 2-1 (S718). In this way, when the SIP message passes through a path closed to one scope, even though processing notification of extended processings is not made, SIP proxies that execute RTP proxy interaction can be uniquely decided.

As a result, since the exchange of message 120 between the SIP proxies and the RTP proxies decreases, a delay time during SIP message transfer is reduced. Since the number of RTP proxies that relay an RTP stream 110 is reduced, a delay time of voice and moving images is reduced. Moreover, a reduction in the amount of processing for SIP messages and RTP streams will contribute to a reduction in loads on RTP proxies.

Unlike the first embodiment, when redundant configuration is made within a single scope as in this embodiment, extension to an original signaling protocol (SIP in this case) is not required. Although only one RTP proxy may exist within one scope, even in such a case, there is an effect that the number of messages 120 exchanged between SIP proxies and RTP proxies can be reduced.

Third Embodiment

In the first and second embodiments, examples have been shown that SIP proxies execute RTP proxy interaction, which is a sort of extended processing. In this embodiment, as a different example of extended processing, the operation of SIP proxy-presence server interaction (hereinafter referred to as presence server interaction) will be described. In the presence server interaction referred to in this embodiment, when a session is established between SIP UAs, an SIP proxy updates the status of both SIP UAs to "busy", and when the session terminates, updates the status to "online". This embodiment and a forth embodiment assume that the scope of a location server and the range of the SIP UAs and the SIP proxy managed by a presence server coincide with each other.

Figure 3:
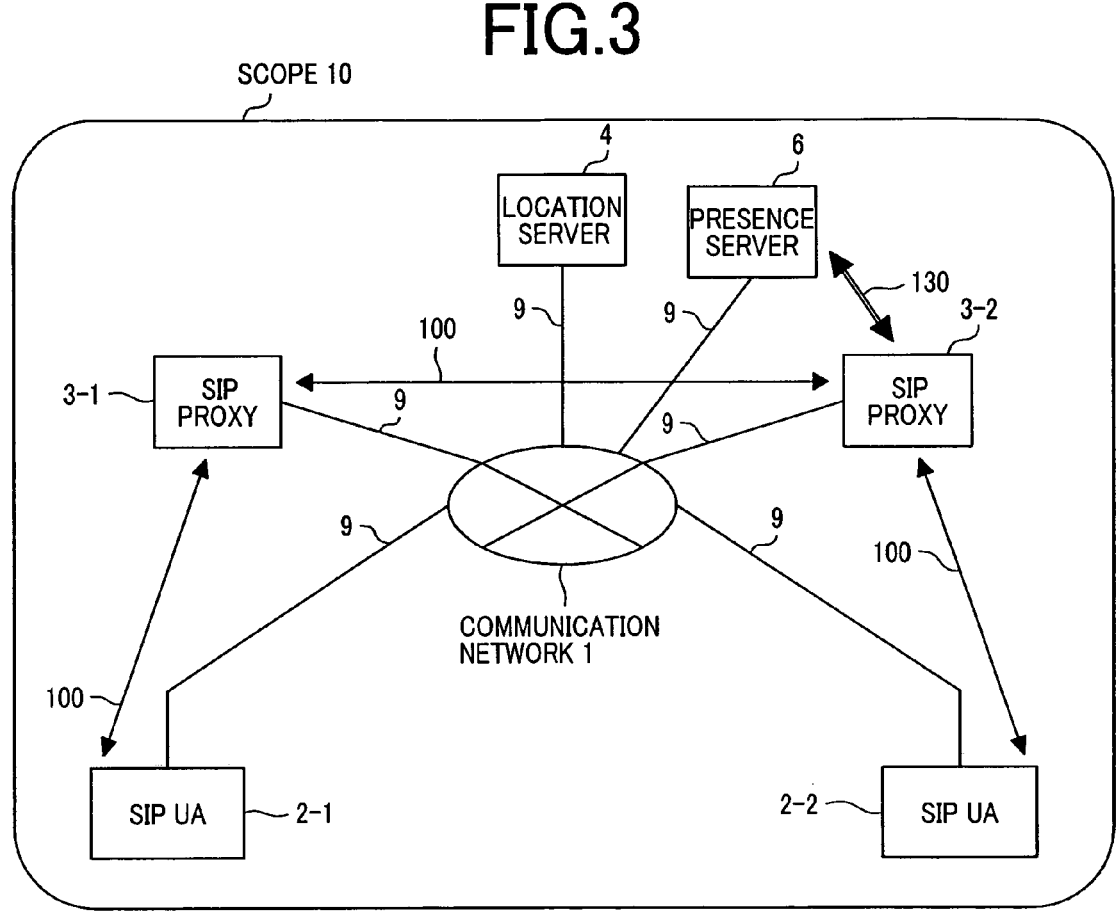
FIG. 3 is a drawing showing a physical configuration of a network assumed in a third embodiment.

FIG. 3 shows a physical configuration of a network assumed in this embodiment. SIP UAs 2-1 and 2-2 are the same as those in the first embodiment. SIP proxies 3-1 and 3-2 decide a route of an SIP message based on information managed by a location server 4, and transfer the message. The communication network 1, the SIP UAs 2-1 and 2-2, the SIP proxies 3-1 and 3-2, the location server 4, and a presence server 6 are mutually connected through the physical communication lines 9. For the reason of maintaining security connection such as TLS (Transport Layer Security), the SIP UAs 2-1 and 2-2 can transmit and receive SIP messages only via the SIP proxies 3-1 and 3-2, respectively. However, this embodiment is not limited to the reason, and the same processing is executed when SIP messages follow the same path.

They belong to the same scope 10. The scope 10 is simply a range managed by the location server 4; the range of a scope is not necessarily limited by physical positions. In the drawing, however, to ease understanding, the range of a scope is made to coincide with physical positions on a communication network.

In the third embodiment, a session is established between the SIP UA 2-1 and the SIP UA 2-2. Thin solid lines 100 show the flow of an SIP message when a session is established between the SIP UA 2-1 and the SIP UA 2-2. In this embodiment, the SIP UA 2-1 is a caller (SIP UA that transmits INVITE), and the SIP UA 2-2 is a callee.

Figure 6:
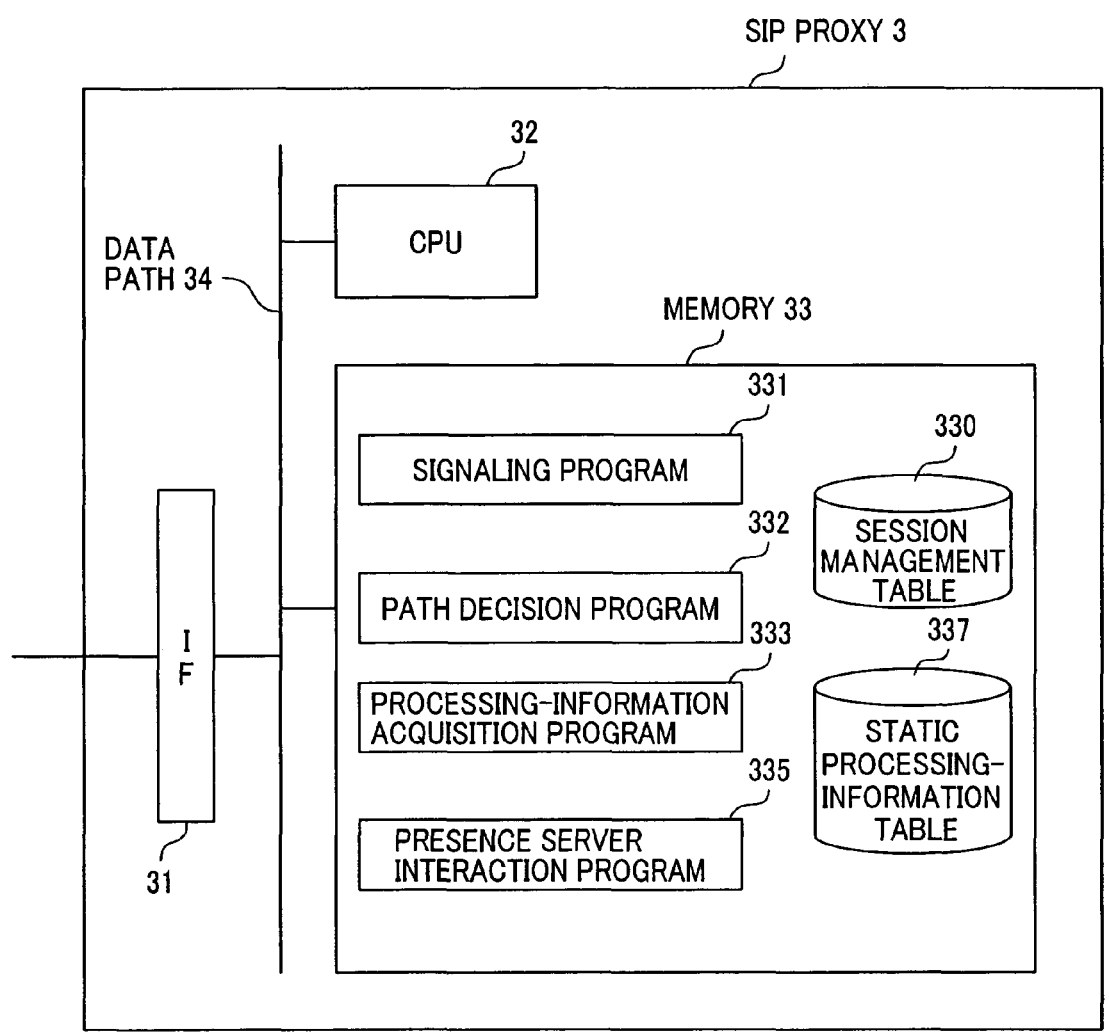
FIG. 6 is a block diagram showing functional expansion of an internal configuration of an SIP proxy in the third embodiment.

FIG. 6 is a block diagram showing functional expansion of an internal configuration of the SIP proxy 3 (common to the SIP proxy 3-1 and the SIP proxy 3-2) shown in FIG. 3. The internal configuration in this embodiment is the same as the internal configuration of the SIP proxy 3 in the first embodiment, except that the presence server interaction program 335 is stored in the memory 33 in place of the RTP proxy interaction program 334. Flowcharts of programs except the presence server interaction program 335 are the same as those in the first embodiment.

The presence server interaction program 335, which executes extended processings, receives calculation results of the path decision program 332 and the processing-information acquisition program 333, and only when specific conditions are satisfied, executes presence server interaction. In this embodiment and the fourth embodiment, PUBLISH of an SIP message is transmitted from the SIP proxy 3 to the presence server 6 to update the status of the SIP UA. However, a method of updating the status of SIP UA is not limited to PUBLISH.

By the way, the presence server interaction program 335 of this embodiment and the fourth embodiment follows a policy that the first SIP proxy that can execute presence server interaction executes presence server interaction. However, when an SIP message passes through a path closed to one scope, a presence server interaction program may be created that follows a different policy, for example, a policy that executes presence server interaction when it can be executed and the next hop is SIP UA. However, on a path of an SIP message, an SIP proxy may exist that cannot execute presence server interaction due to temporary trouble or the like. Therefore, it is desirable to follow the policy of this embodiment and the fourth embodiment in terms of measures against trouble.

In this embodiment and the fourth embodiment, information that all same-scope UAs request presence server interaction is stored in the static processing-information table 337. When only part of the UAs requests presence server interaction, information indicating it must be stored in the static processing-information table 337. However, such a case can also be covered by the same presence server interaction program 335 as in this embodiment.

Figure 18:
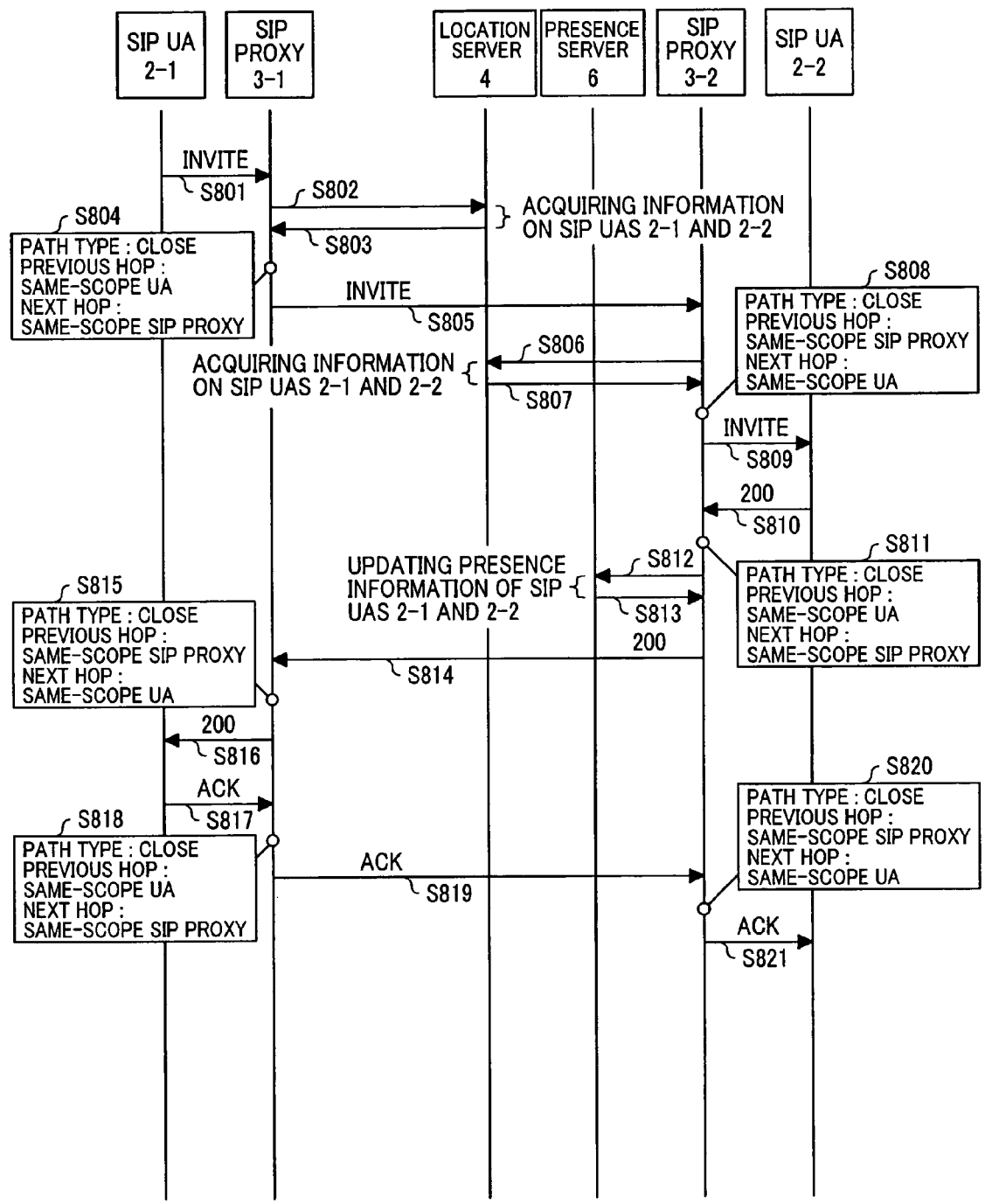
FIG. 18 is a drawing showing an operation sequence of the third embodiment.

FIG. 18 is a sequence diagram showing an example of the operation of establishing a session between the SIP UA 2-1 and the SIP UA 2-2. Hereinafter, with reference to the sequence diagram shown in FIG. 18 and flowcharts shown in FIGS. 8 to 10, and FIGS. 14 and 15, a description will be made of the process in which an SIP proxy to execute presence server interaction is dynamically decided when an SIP message passes through plural SIP proxies.

When the SIP proxy 3-1 receives INVITE (S801) containing SDP from the SIP UA 2-1, the INVITE is passed to the signaling program 331. The signaling program 331 calls the path decision program 332 in the processing.

The path decision program 332 operates exactly in the same way as when the SIP proxy 3-1 in the second embodiment receives INVITE. It returns information (S804) thus obtained to the signaling program 331. Upon termination of the path decision program 332, the signaling program 331 calls the processing-information acquisition program 333.

The processing-information acquisition program 333 acquires the cache of information on SIP UA belonging to the same scope from the session management table (this is the cache registered in S127). Although cache is used in this embodiment, the location server may be accessed again when cache is not used. An exclusive server to store dynamic information on extended processings may be accessed if it exists aside from the location server. If throughput is emphasized, cache is used, while if emphasis is placed on saving a memory and a disk area on the SIP proxy, it is desirable to use the location server and the exclusive server.

In this example, since both the caller UA and the callee UA are same-scope UAs (S201, S203), the processing-information acquisition program 333 acquires their respective processing information (S202, S204). In this embodiment, since an extended processing (RTP proxy interaction etc.) based on dynamic information does not exist, no dynamic information can be acquired. Then, it acquires common processing information within the same scope from the static processing-information table (S205). The processing-information acquisition program 333 returns static information that "all same-scope UAs request presence server interaction" obtained as mentioned above to the signaling program 331.

The signaling program 331 calls the presence server interaction program 335. When the signaling program 331 calls an extended processing program such as the presence server interaction program 335, it passes a calculation result received from the path decision program 332 and the processing-information acquisition program 333.

The presence server interaction program 335 checks whether the previous hop or the next hop is a same-scope UA (S401). In this example, since both of them are same-scope UAs, it checks whether the static processing information requests presence server interaction (S402). In this example, since it is understood from the information acquired from the static processing-information table 337 in S205 that the caller UA and the callee UA, which are same-domain UAs, request presence server interaction, it proceeds to the next processing.

However, since the SIP message is INVITE in this example, the processing terminates after the checking in S403 and S413. Unlike the RTP proxy interaction executed when a session is being established, the presence server interaction is executed after a session has been established. Upon termination of the above processing, the signaling program 331 transfers INVITE to the SIP proxy 3-2 (S805).

When the SIP proxy 3-2 receives INVITE (S805) containing SDP from the SIP proxy 3-1, the INVITE is passed to the signaling program 331. The signaling program 331 calls the path decision program 332 in the processing. The path decision program 332 operates exactly in the same way as when the SIP proxy 3-1 in the second embodiment receives INVITE. It returns information (S808) thus obtained to the signaling program 331.

Upon termination of the path decision program 332, the signaling program 331 calls the processing-information acquisition program 333. The processing-information acquisition program 333 proceeds like when the SIP proxy 3-1 receives INVITE in this embodiment, and returns information that "all same-scope UAs request presence server interaction" to the signaling program 331.

The signaling program 331 calls the presence server interaction program 335. When the signaling program 331 calls an extended processing program such as the presence server interaction program 335, it passes a calculation result received from the path decision program 332 and the processing-information acquisition program 333. The presence server interaction program 335 proceeds like when the SIP proxy 3-1 receives INVITE in this embodiment, and terminates the processing before executing presence server interaction. Upon termination of the above processing, the signaling program 331 transfers INVITE to the SIP UA 2-2 (S809).

Assume that the SIP UA 2-2 receives INVITE, then responds with 200 (S810) containing SDP. When the SIP proxy 3-2 receives the 200, the 200 is passed to the signaling program 331. The signaling program 331 calls the path decision program 332 in the processing.

When the SIP message is a response, the path decision program 332 uses the information at the time of the request. It acquires the path type, previous hop, and next hop at the request of the session from the session management table (S112). It sets path type to that at the request (S113), sets previous hop and next hop reversely to those at the request (S114), and returns obtained information (S613) to the signaling program 331.

Upon termination of the path decision program 332, the signaling program 331 calls the processing-information acquisition program 333. The processing-information acquisition program 333 returns to the signaling program 331 the same information when the SIP proxy 3-2 receives INVITE in this embodiment. The signaling program 331 calls the presence server interaction program 335.

The presence server interaction program 335 checks whether the previous hop or the next hop is a same-scope UA (S401). In this example, since both of them are same-scope UAs, it checks whether the static processing information requests presence server interaction (S402). In this example, since it is understood from the information acquired from the static processing-information table 337 in S205 that the caller UA and the callee UA, which are same-domain UAs, request presence server interaction, it proceeds to the next processing.

In this example, since the received SIP message is 200 (S403), the presence server interaction program 335 acquires information on the session from the session management table. The received SIP message is 200 (S405), INVITE of the session contains SDP (S406), and the SIP message (200 referred to here) contains SDP (S407). Accordingly, it checks whether the path type is "closed" (S414). Since the path type is "closed" but the previous hop is a same-scope UA (SIP UA 2-2) (S415), it continues the processing. The above is a processing condition judgment part of the presence server interaction program 335. The presence server interaction program 335 executes such processing condition judgment in order that the same programs can be used also in network configurations of other than this embodiment.

Then, the presence server interaction program 335 respectively determines whether the caller UA and the callee UA are same-scope UAs (S416, S420). Since both of them are same-scope UAs, it updates the status to "busy" (S418, S422). Unlike the RTP proxy interaction, since the presence server interaction terminates with one-time processing, execution of the presence server interaction does not need to be recorded in the session management table.

This embodiment and the forth embodiment assume that the scope of the location server 4 and the range of the SIP UAs and the SIP proxy managed by the presence server coincide with each other. In short, since presence server interaction is executed once for each scope, processing notification of presence server interaction does not need to be transmitted or received among SIP proxies belonging to different scopes. However, to execute interaction among SIP proxies more strictly, only when the path type is "closed", processing notification of presence server interaction may be added to the SIP message in the same way as processing notification of RTP proxy interaction. The above is a processing part of the presence server interaction program 335.

Upon termination of the above processing, the signaling program 331 transfers 200 to the SIP proxy 3-1 (S814). When the SIP proxy 3-1 receives the 200 (S814) containing SDP from the SIP proxy 3-2, the 200 is passed to the signaling program 331. The signaling program 331 calls the path decision program 332 in the processing.

When the SIP message is a response, the path decision program 332 uses the information at the time of the request. It acquires the path type, previous hop, and next hop at the request of the session from the session management table (S112). It sets path type to that at the request (S113), sets previous hop and next hop reversely to those at the request (S114), and returns obtained information (S615) to the signaling program 331.

Upon termination of the path decision program 332, the signaling program 331 calls the processing-information acquisition program 333. The processing-information acquisition program 333 returns to the signaling program 331 the same information when the SIP proxy 3-1 receives INVITE in this embodiment.

The signaling program 331 calls the RTP proxy interaction program 334. The RTP proxy interaction program 334 proceeds to its middle part like when the SIP proxy 3-2 receives 200. However, when the path type is "closed" (S414), and the previous hop is a same-scope SIP proxy (S415), it is implicitly understood that an SIP proxy of the previous hop has already executed presence server interaction. Therefore, the program terminates.

However, to execute interaction among SIP proxies more strictly, when the path type is "closed", if processing notification of presence server interaction is not made, presence server interaction may be executed. Upon termination of the above processing, the signaling program 331 transfers INVITE to the SIP UA 2-1 (S816).

In this way, also for presence server interaction, which is an extended processing other than RTP proxy interaction, by adding a program consisting of a processing condition judgment part and a processing part, SIP proxies that execute the extended processing can be uniquely decided.

As a result, since the exchange of a message 130 between the SIP proxies and the presence server decreases, a delay time during SIP message transfer is reduced. Moreover, a reduction in the amount of processing for SIP messages will contribute to a reduction in loads on the presence server. Unlike the first embodiment, when redundant configuration is made within a single scope as in this embodiment, extension to an original signaling protocol (SIP in this case) is not required.

Fourth Embodiment

In the first to third embodiments, examples have been shown that SIP proxies execute a single extended processing. In this embodiment, a description will be made of the operation of the system when SIP proxies execute plural extended processings. In this embodiment, two extended processings, the RTP proxy interaction shown in the first and second embodiments and the presence server interaction shown in the third embodiment, will be executed.

Figure 4:
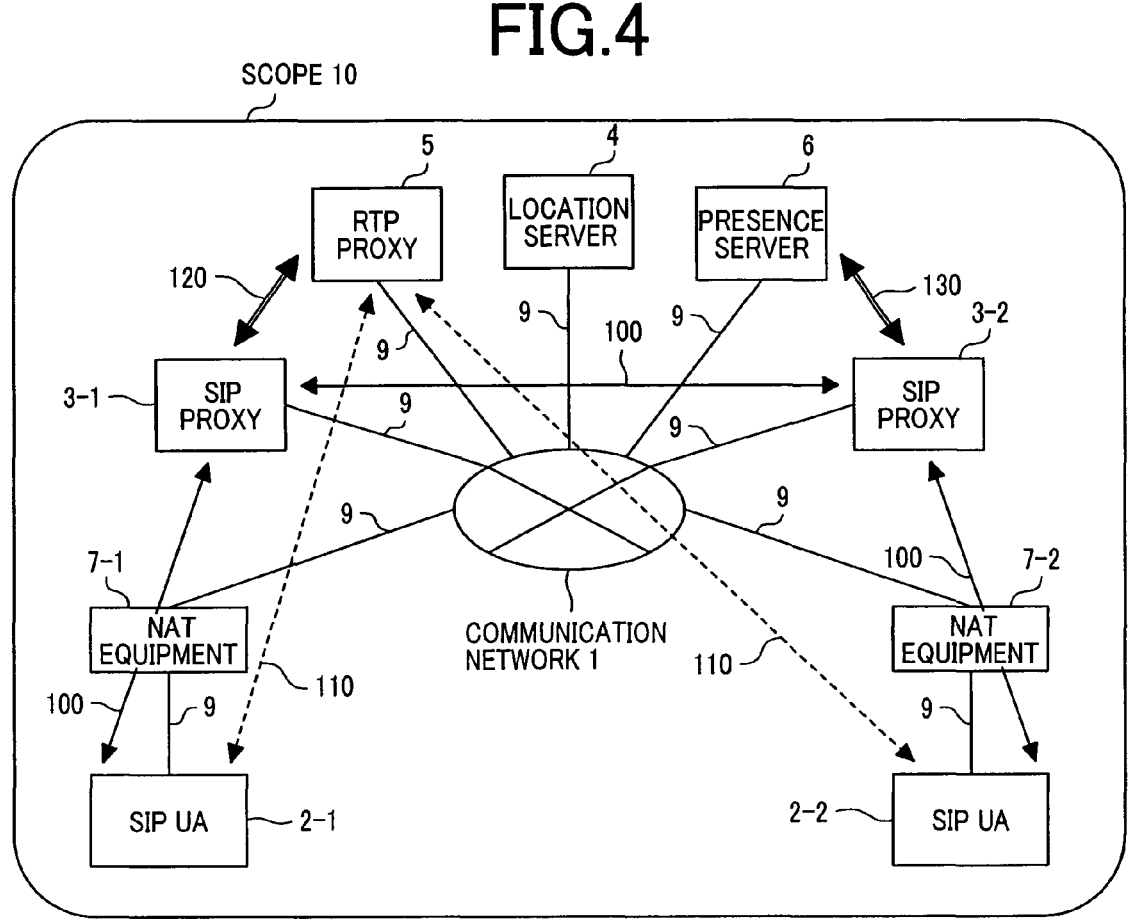
FIG. 4 is a drawing showing a physical configuration of a network assumed in a fourth embodiment.

FIG. 4 shows a physical configuration of a network assumed in this embodiment. The configuration diagram is the same as that in the second embodiment (FIG. 2), except that, in addition to the RTP proxy 5, the presence server 6 is connected to the communication network 1 via the communication lines 9.

Figure 7:
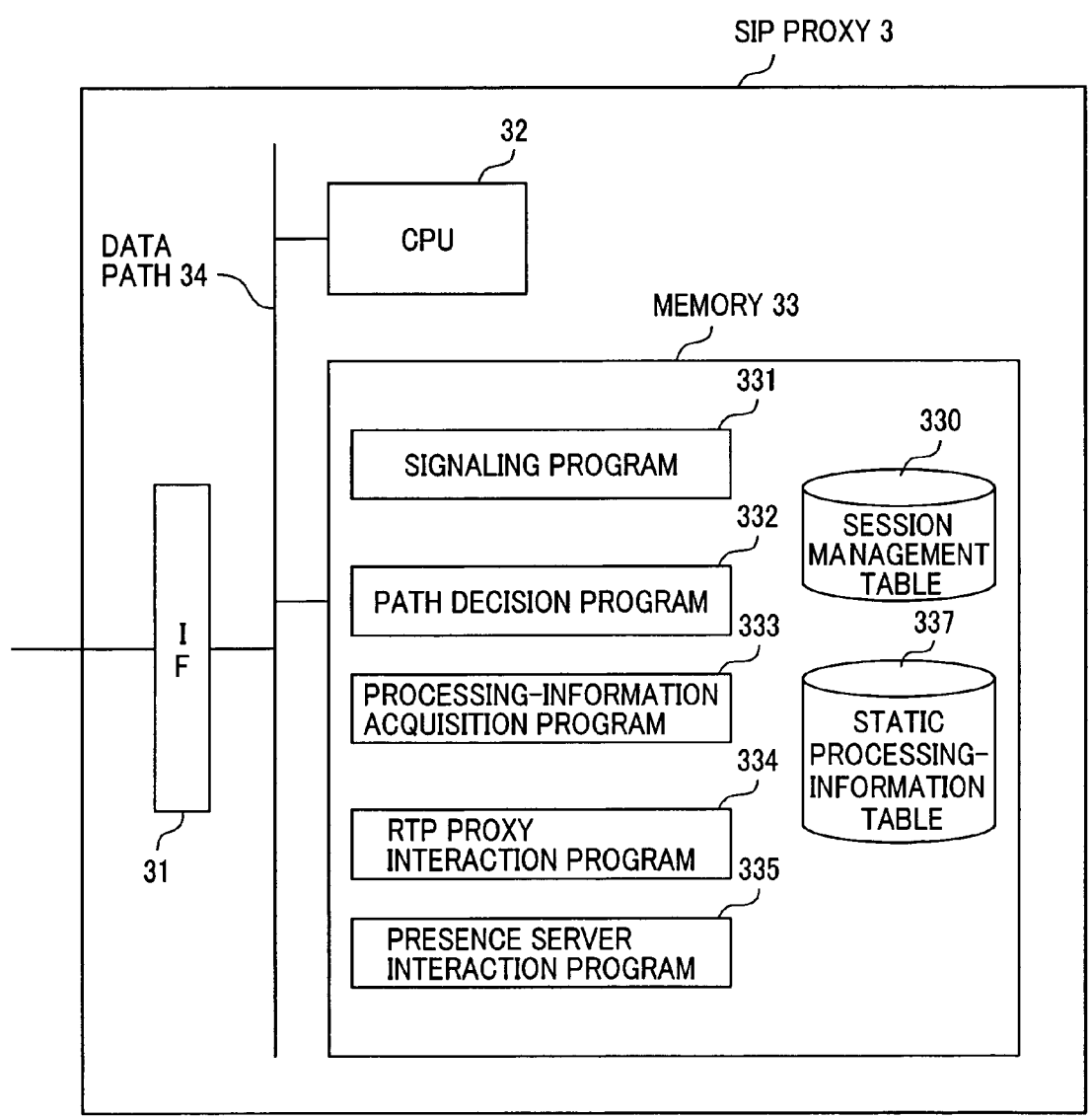
FIG. 7 is a block diagram showing functional expansion of an internal configuration of an SIP proxy in the fourth embodiment.
Figure 8:
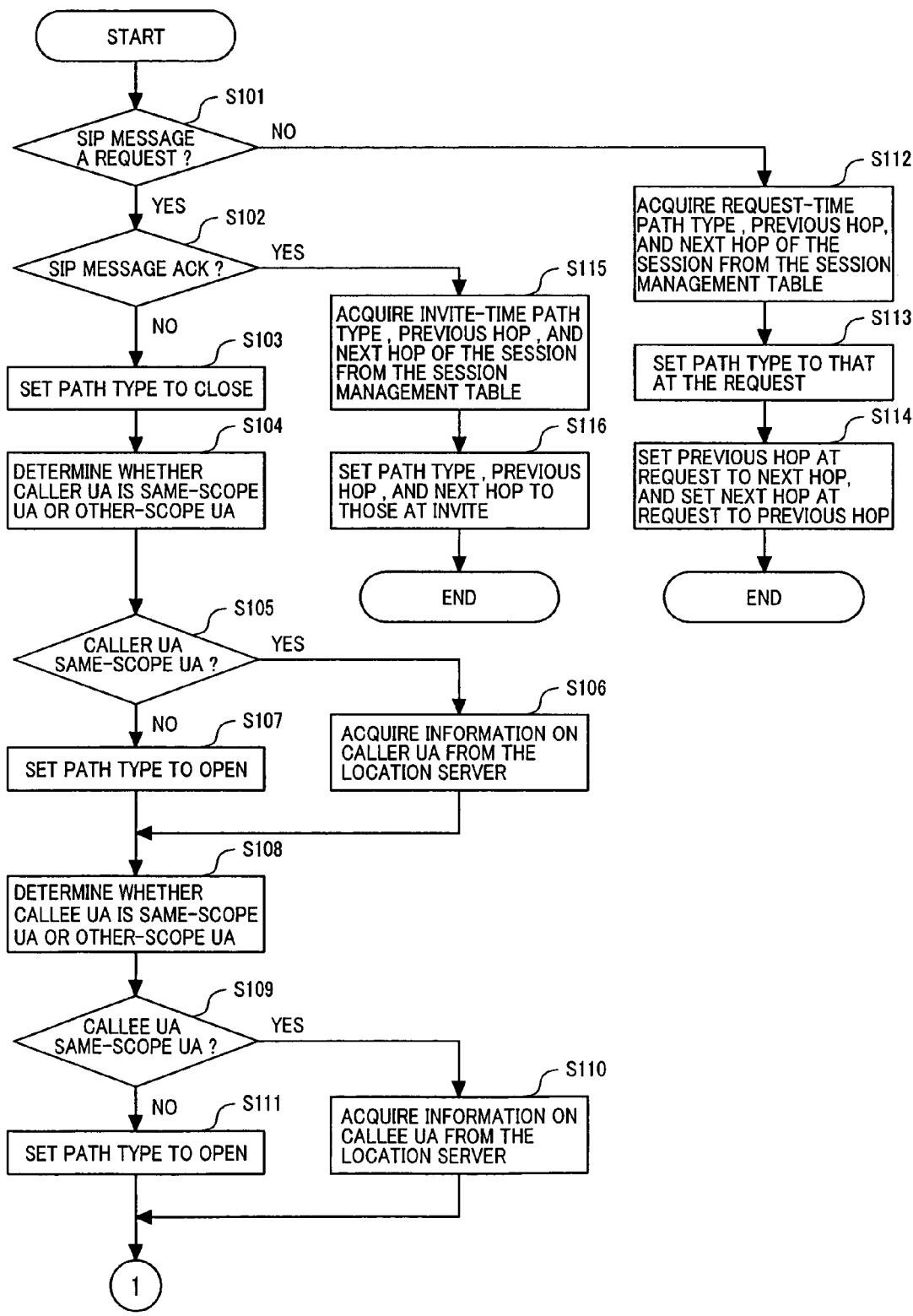
FIG. 8 is a flowchart showing internal operation of a path decision program.
Figure 9:
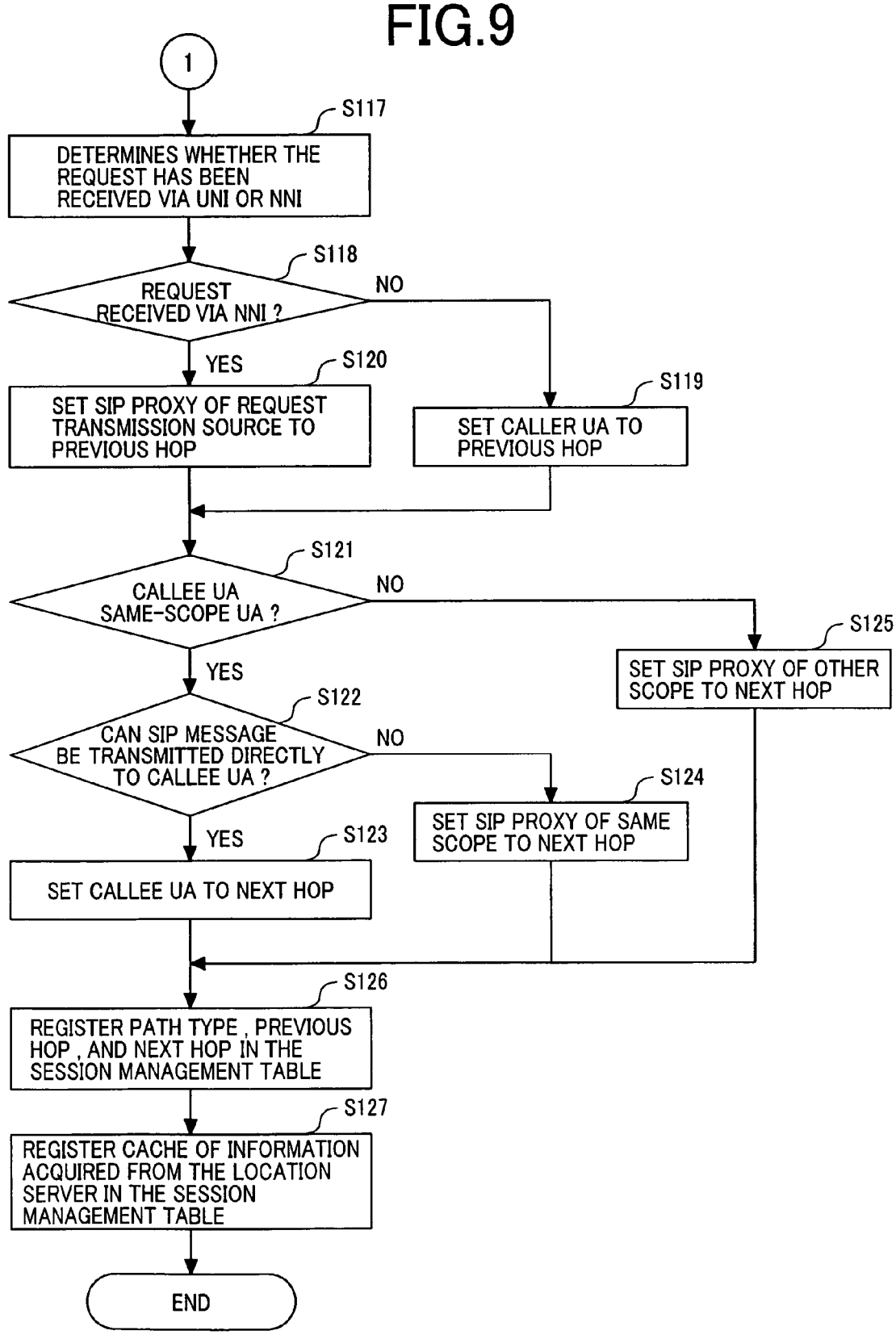
FIG. 9 is a flowchart showing internal operation of the path decision program.
Figure 10:
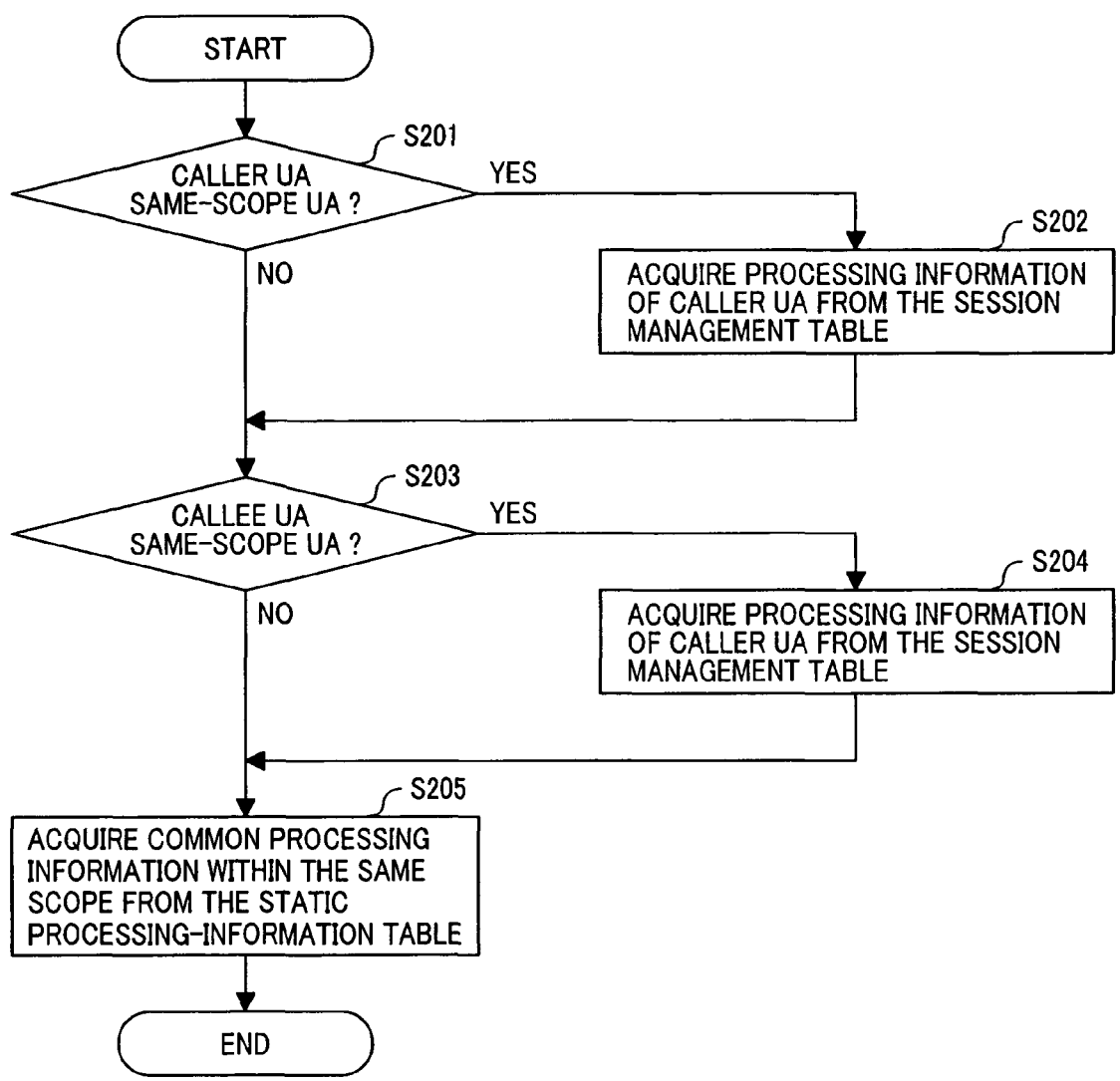
FIG. 10 is a flowchart showing internal operation of a processing-information acquisition program.
Figure 11:
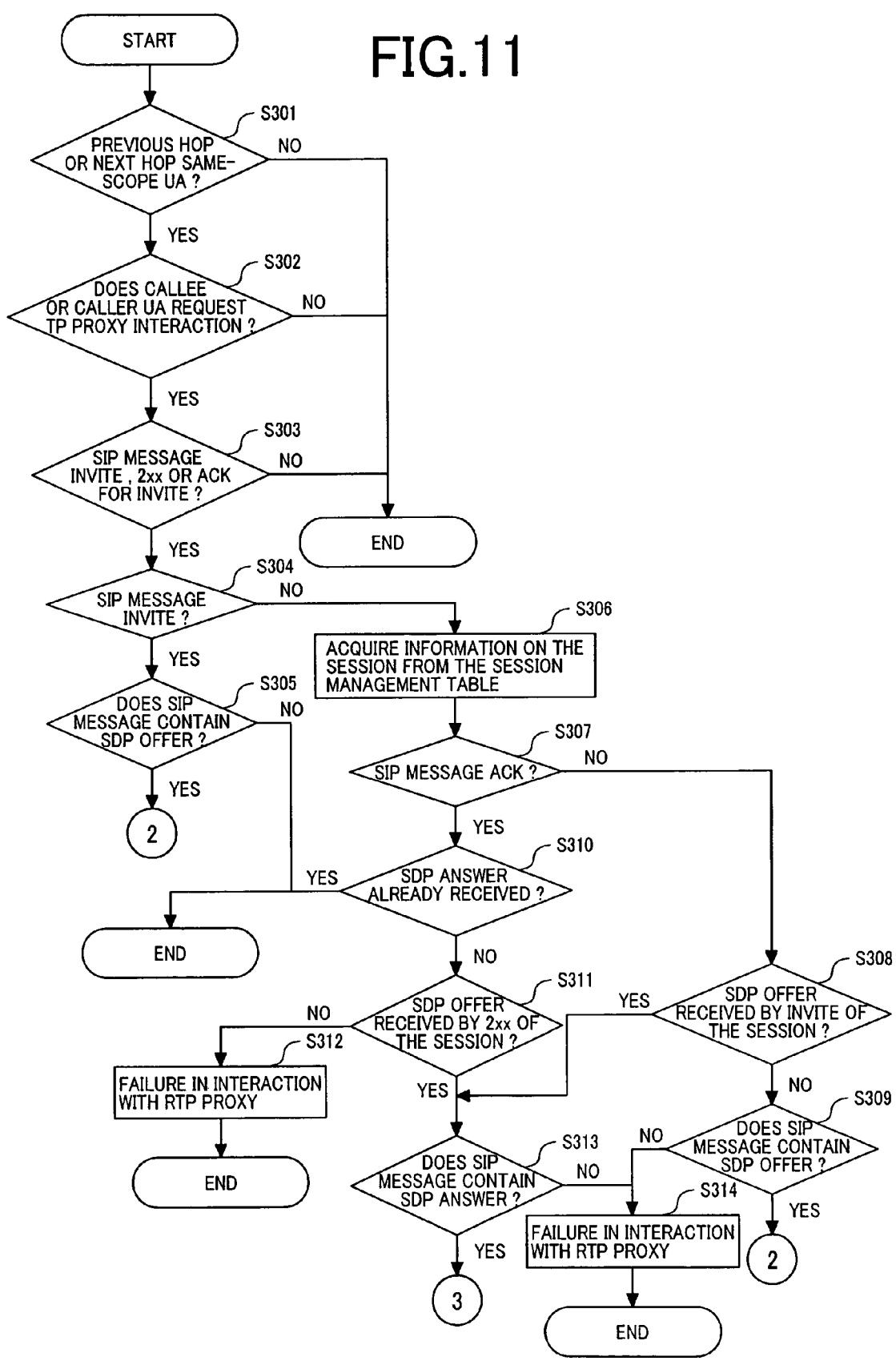
FIG. 11 is a flowchart showing internal operation of an RTP proxy interaction program.
Figure 12:
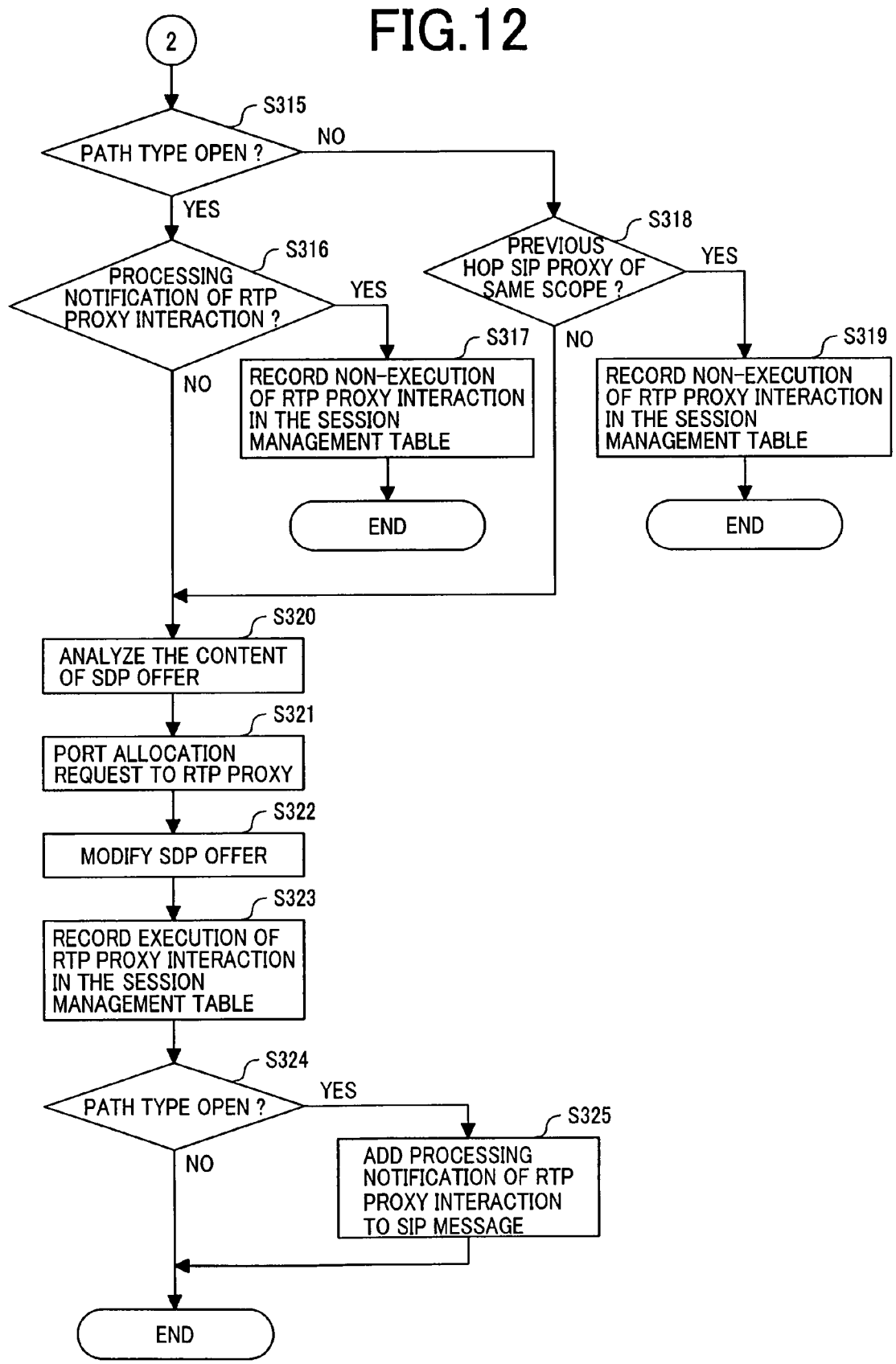
FIG. 12 is a flowchart showing internal operation of the RTP proxy interaction program.
Figure 13:
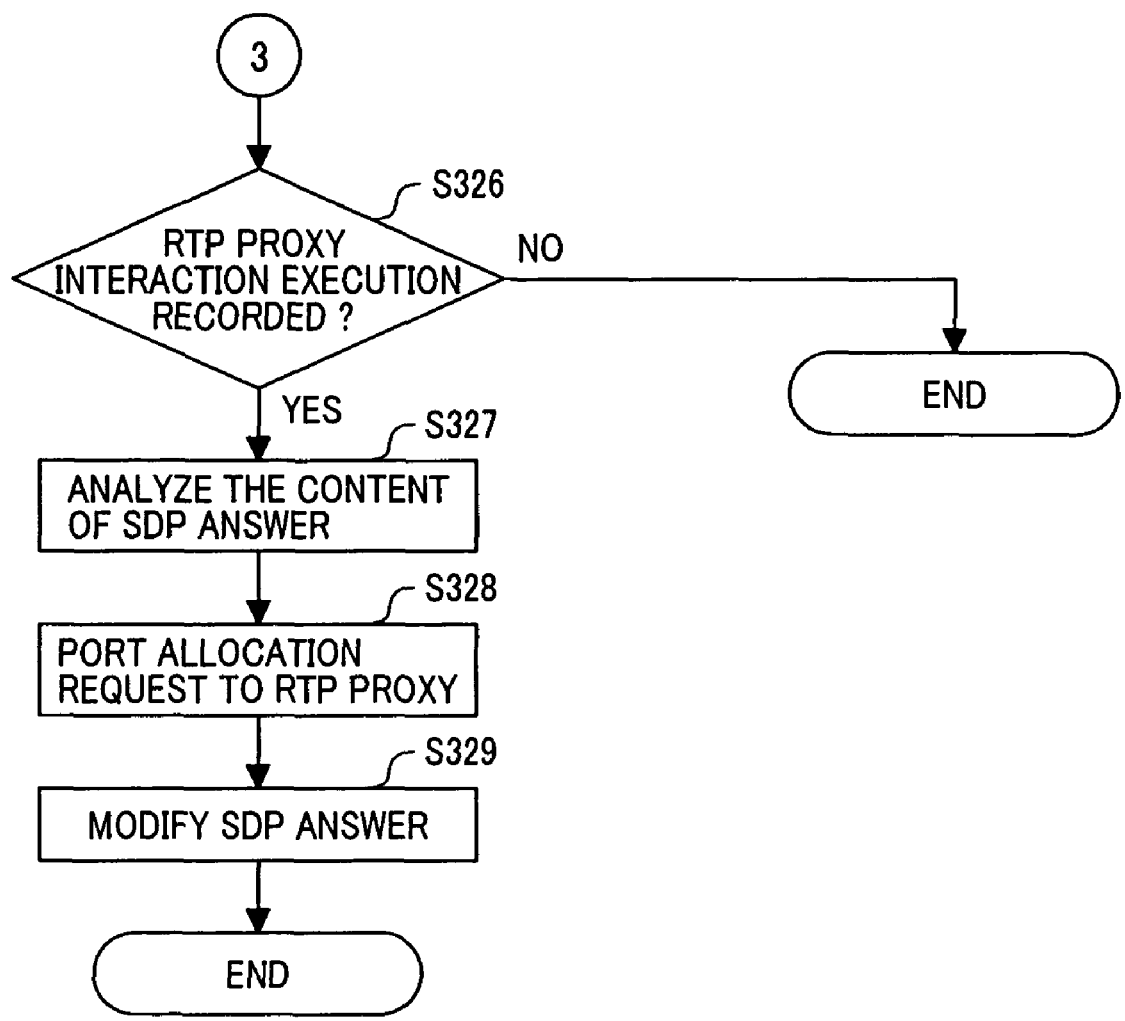
FIG. 13 is a flowchart showing internal operation of the RTP proxy interaction program.
Figure 14:
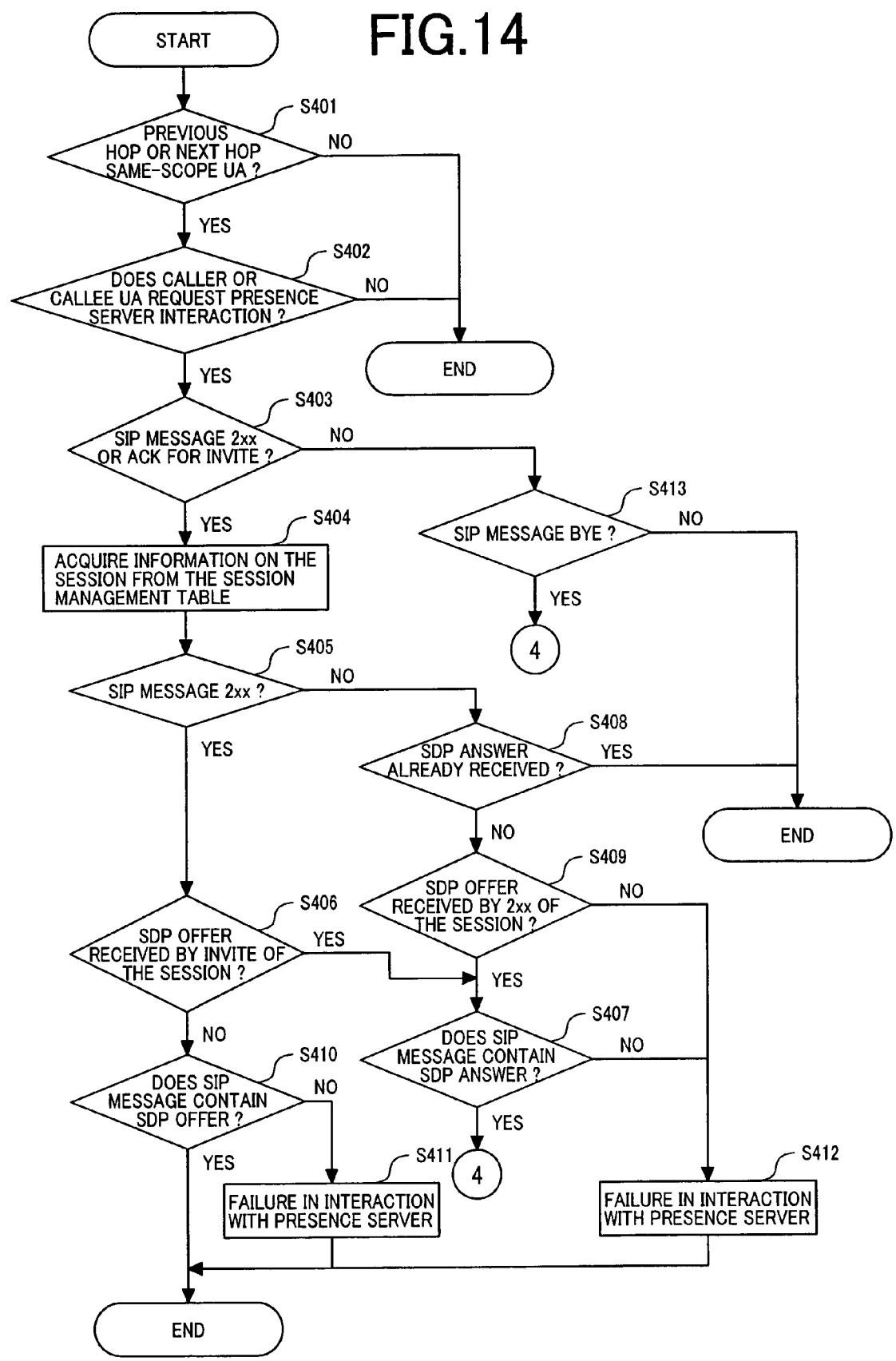
FIG. 14 is a flowchart showing internal operation of a presence server interaction program.
Figure 15:
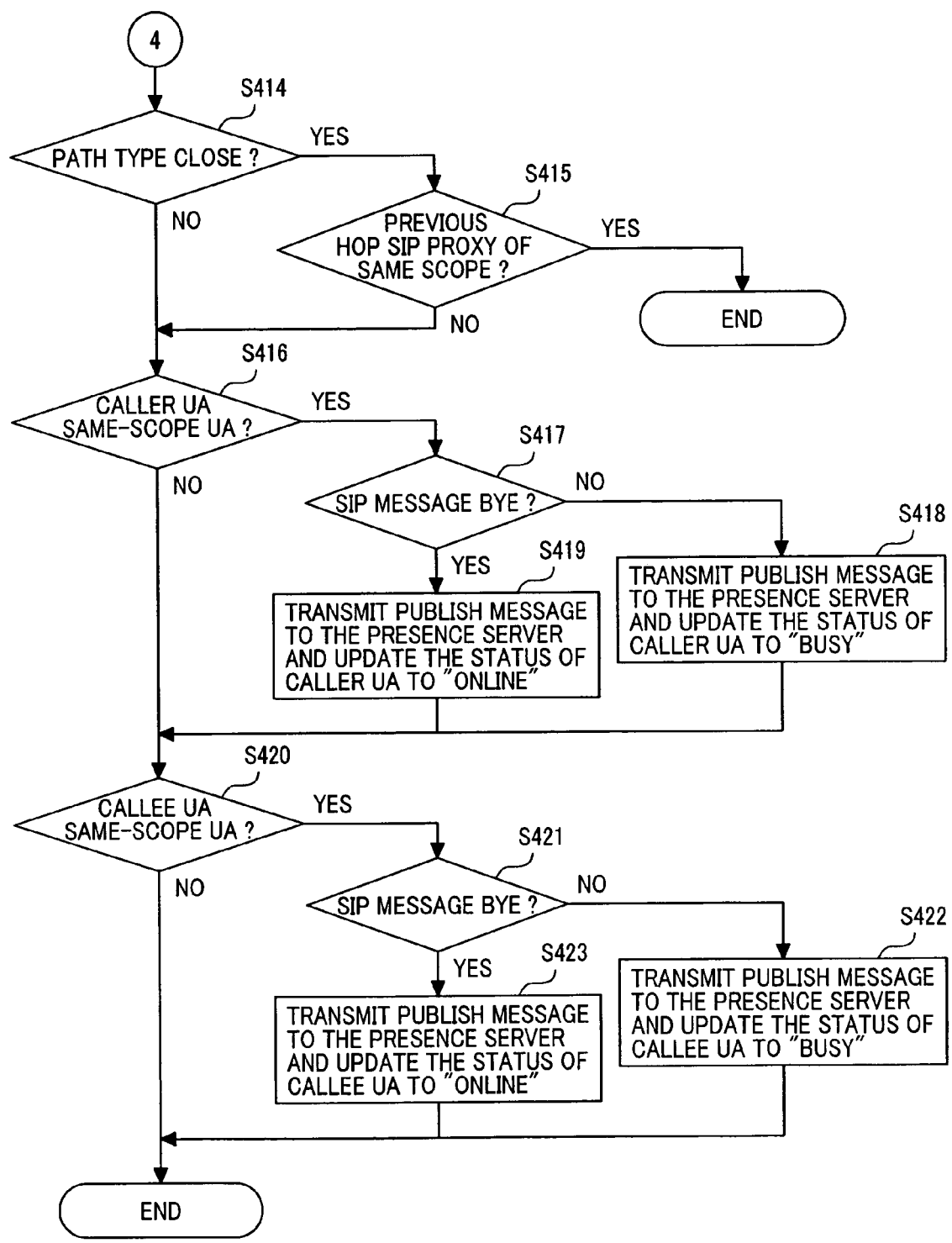
FIG. 15 is a flowchart showing internal operation of the presence server interaction program.

FIG. 7 is a block diagram showing functional expansion of an internal configuration of the SIP proxy 3 (common to the SIP proxy 3-1 and the SIP proxy 3-2) shown in FIG. 4. The internal configuration in this embodiment is the same as the internal configuration of the SIP proxy 3 in the first embodiment (FIG. 5), except that the presence server interaction program 335 in addition to the RTP proxy interaction program 334 is stored in the memory 33.

Flowcharts of programs except the presence server interaction program 335 are the same as those in the first embodiment. A flowchart of the presence server interaction program 335 is the same as that in the third embodiment. The static processing-information table 337 stores the same information as that in the third embodiment.

Figure 19:
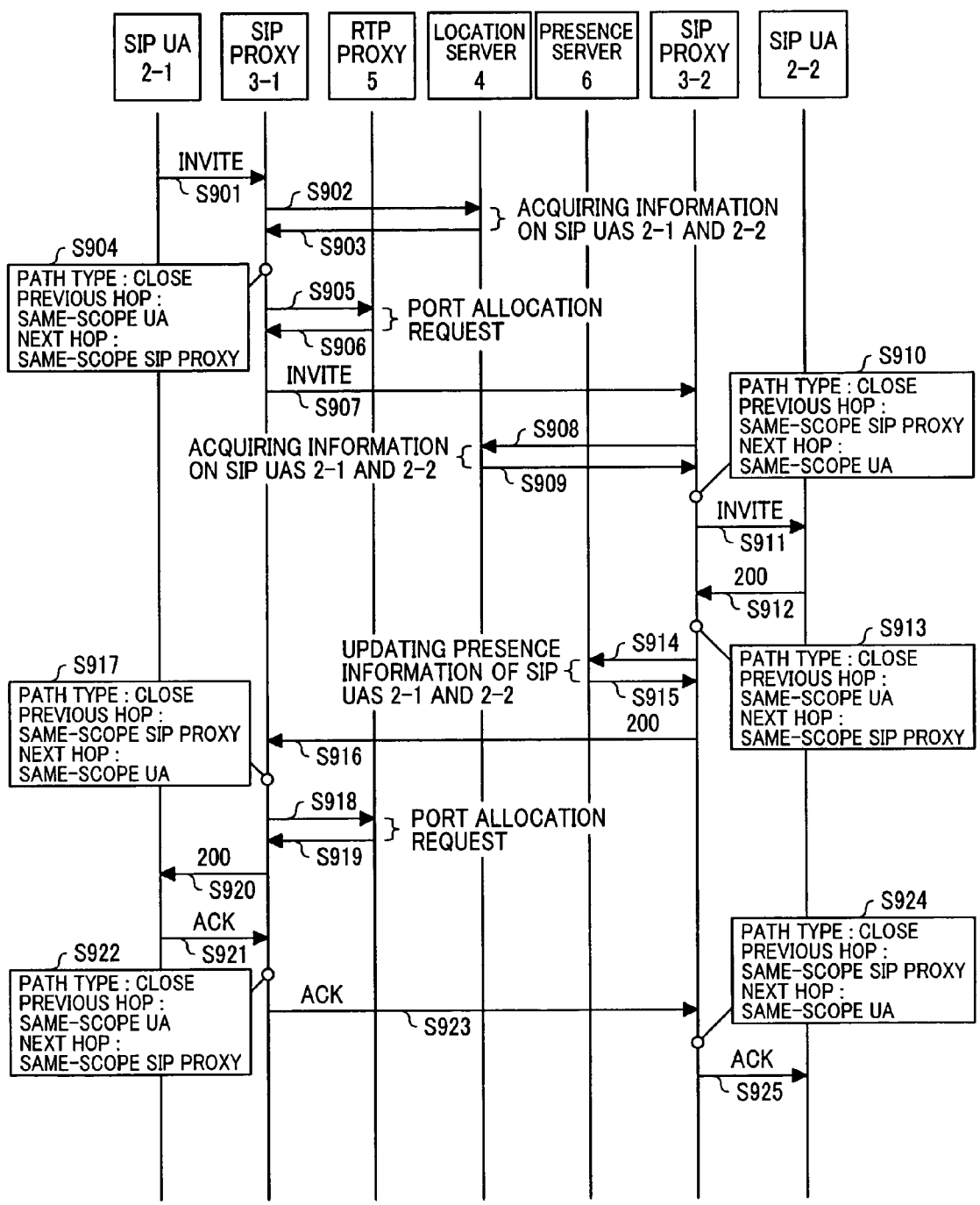
FIG. 19 is a drawing showing an operation sequence of the fourth embodiment.
Figure 21:
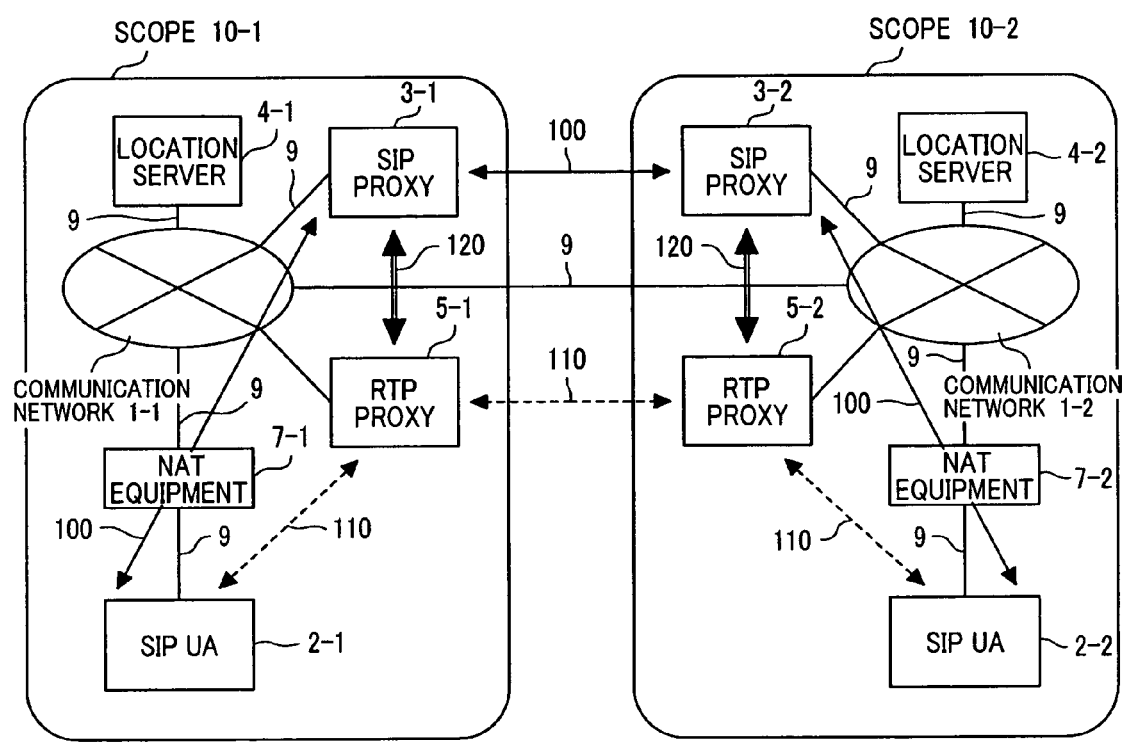
FIG. 21 is a drawing showing a physical configuration of a network that uses conventional SIP proxies.

FIG. 19 is a sequence diagram showing an example of the operation of establishing a session between the SIP UA 2-1 and the SIP UA 2-2. Hereinafter, with reference to the sequence diagram shown in FIG. 19 and flowcharts shown in FIGS. 8 to 15, a description will be made of the process in which SIP proxies to execute RTP proxy interaction and presence server interaction are respectively dynamically decided when an SIP message passes through plural SIP proxies.

When the SIP proxy 3-1 receives INVITE (S901) containing SDP from the SIP UA 2-1, the INVITE is passed to the signaling program 331. The signaling program 331 calls the path decision program 332 in the processing.

The path decision program 332 operates exactly in the same way as when the SIP proxy 3-1 in the second embodiment receives INVITE. It returns information (S904) thus obtained to the signaling program 331. Upon termination of the path decision program 332, the signaling program 331 calls the processing-information acquisition program 333.

The processing-information acquisition program 333 acquires the cache of information on SIP UA belonging to the same scope from the session management table (this is the cache registered in S127). Although cache is used in this embodiment, the location server may be accessed again when cache is not used. An exclusive server to store dynamic information on extended processings may be accessed if it exists aside from the location server. If throughput is emphasized, cache is used, while if emphasis is placed on saving a memory and a disk area on the SIP proxy, it is desirable to use the location server and the exclusive server.

In this example, since both the caller UA and the callee UA are same-scope UAs (S201, S203), the processing-information acquisition program 333 acquires their respective processing information (S202, S204). Then, it acquires common processing information within the same scope from the static processing-information table (S205). The processing-information acquisition program 333 returns dynamic information that "Caller UA and callee UA request RTP proxy interaction" and static information that "All same-scope UAs request presence server interaction" that have been obtained as mentioned above to the signaling program 331.

The signaling program 331 calls the RTP proxy interaction program 334 and the presence server interaction program 335. When the signaling program 331 calls these extended processing programs, it passes a calculation result received from the path decision program 332 and the processing-information acquisition program 333. Even if the order in which these extended processing programs are called is changed, an overall processing result is not changed.

The RTP proxy interaction program 334 operates exactly in the same way as when the SIP proxy 3-1 in the second embodiment receives INVITE, and executes RTP proxy interaction. It records information indicating that RTP proxy interaction has been executed in the session, in the session management table 330 (S323), and terminates.

The presence server interaction program 335 operates exactly in the same way as when the SIP proxy 3-1 in the third embodiment receives INVITE, and terminates without executing presence server interaction. Upon termination of the above processing, the signaling program 331 transfers INVITE to the SIP proxy 3-2 (S907).

When the SIP proxy 3-2 receives INVITE (S907) containing SDP from the SIP proxy 3-1, the INVITE is passed to the signaling program 331. The signaling program 331 calls the path decision program 332 in the processing.

The path decision program 332 operates exactly in the same way as when the SIP proxy 3-1 in the second embodiment receives INVITE. It returns information (S910) thus obtained to the signaling program 331. Upon termination of the path decision program 332, the signaling program 331 calls the processing-information acquisition program 333.

The processing information program 333 proceeds like when the SIP proxy 3-1 receives INVITE in this embodiment, and returns dynamic information that "Caller UA and callee UA request RTP proxy interaction" and static information that "All same-scope UAs request presence server interaction" to the signaling program 331.

The signaling program 331 calls the RTP proxy interaction program 334 and the presence server interaction program 335. When the signaling program 331 calls these extended processing programs, it passes a calculation result received from the path decision program 332 and the processing-information acquisition program 333. Even if the order in which these extended processing programs are called is changed, an overall processing result is not changed.

The RTP proxy interaction program 334 operates exactly in the same way as when the SIP proxy 3-2 in the second embodiment receives INVITE, and does not execute RTP proxy interaction. It records information indicating that RTP proxy interaction has not been executed in the session, in the session management table 330 (S319), and terminates.

The presence server interaction program 335 operates exactly in the same way as when the SIP proxy 3-2 in the third embodiment receives INVITE, and terminates without executing presence server interaction. Upon termination of the above processing, the signaling program 331 transfers INVITE to the SIP UA 2-2 (S911).

Assume that the SIP UA 2-2 receives INVITE, then responds with 200 (S612) containing SDP. When the SIP proxy 3-2 receives the 200, the 200 is passed to the signaling program 331. The signaling program 331 calls the path decision program 332 in the processing.

The path decision program 332 operates exactly in the same way as when the SIP proxy 3-2 in the second embodiment receives 200. It returns information (S913) thus obtained to the signaling program 331. Upon termination of the path decision program 332, the signaling program 331 calls the processing-information acquisition program 333. The processing-information acquisition program 333 returns to the signaling program 331 the same information when the SIP-proxy 3-2 receives INVITE in this embodiment. The signaling program 331 calls the RTP proxy interaction program 334 and the presence server interaction program 335. The RTP proxy interaction program 334 operates exactly in the same way as when the SIP proxy 3-2 in the second embodiment receives 200, and terminates without executing RTP proxy interaction.

The presence server interaction program 335 operates exactly in the same way as when the SIP proxy 3-2 in the third embodiment receives 200, and executes presence server interaction. Then, the program terminates. Upon termination of the above processing, the signaling program 331 transfers 200 to the SIP proxy 3-1 (S916).

When the SIP proxy 3-1 receives the 200 (S916) containing SDP from the SIP proxy 3-2, the 200 is passed to the signaling program 331. The signaling program 331 calls the path decision program 332 in the processing.

The path decision program 332 operates exactly in the same way as when the SIP proxy 3-1 in the second embodiment receives 200. It returns information (S917) thus obtained to the signaling program 331. Upon termination of the path decision program 332, the signaling program 331 calls the processing-information acquisition program 333. The processing-information acquisition program 333 returns to the signaling program 331 the same information when the SIP proxy 3-1 receives INVITE in this embodiment. The signaling program 331 calls the RTP proxy interaction program 334 and the presence server interaction program 335.

The RTP proxy interaction program 334 operates exactly in the same way as when the SIP proxy 3-1 in the second embodiment receives 200, and executes RTP proxy interaction. Then, the program terminates. The presence server interaction program 335 operates exactly in the same way as when the SIP proxy 3-1 in the third embodiment receives 200, and terminates without executing presence server interaction. Upon termination of the above processing, the signaling program 331 transfers INVITE to the SIP UA 2-1 (S920).

In this way, even when there are plural extended processings executed by SIP proxies, SIP proxies that execute respective extended processings can be uniquely decided. It has been shown that, since processing conditions are judged for each of extended processings, one SIP proxy does not always execute all extended processings.

As a result, since the exchange of a message between SIP proxies and external servers (RTP proxy, presence server) decreases, a delay time during SIP message transfer is reduced. Moreover, a reduction in the amount of processing for SIP messages will contribute to a reduction in loads on the external servers.

Unlike the first embodiment, when redundant configuration is made within a single scope as in this embodiment, extension to an original signaling protocol (SIP in this case) is not required. Since the path decision program 332 and the processing-information acquisition program 333 are organized to pass calculation results to their respective extended processing programs, without modifying basic programs of SIP proxy (signaling program 331, path decision program 332, and processing-information acquisition program 333), extended processing programs other than those shown in the fourth embodiment can be newly added. Possible extended processing programs except RTP proxy interaction and presence server interaction are interaction with a Web server, log recording, recording of accounting information, QoS control, and the like.

Hereinbefore, preferred embodiments of the present invention have been described in detail with reference to the accompanying drawings. Concrete configurations are not limited to the above-mentioned embodiments but include any designs and the like that do not depart from main points of the present invention. Protocols are not limited to SIP as far as the effects of the present invention are secured.

What is claimed is:

1. A first signaling gateway managed by a service provider and connected to communication terminals and second signaling gateways, at least one of the second signaling gateways being managed by a different service provider, comprising:

a transmitting/receiving part that receives a signaling message from the communication terminals or the second signaling gateways and transmits the signaling message outside of the first signaling gateway to a destination; and a control part that, based on first information indicating a position of the first signaling gateway on a path through which the signaling message passes to the destination, and second information indicating a status of whether an extended processing has been executed by the second signaling gateways on the path in a session to which the signaling message belongs, the first information and the second information being included in the signaling message, decides, on the basis of the second information, whether to execute the extended processing in the first signaling gateway, and executes the extended processing therein only if the extended processing has not been executed by the second signaling gateways to avoid redundant execution along the path in the session, wherein the extended processing includes communicating with a real-time transport protocol (RTP) proxy server, a presence server, a web server, or a quality of service (QoS) control server coupled to the first signaling gateway via a network, wherein processing required by the session to which the signaling message belongs is a plurality of independent processing including the extended processing, and wherein the first signaling gateway and the second signaling gateways are SIP (Session Initiation Protocol) proxy servers.

2. The first signaling gateway according to claim 1, wherein if the first signaling gateway executes the extended processing therein, the control part updates the second information to indicate that the first signaling gateway has executed the extended processing, and the transmitting/receiving part transmits the signaling message including the updated second information.

3. The first signaling gateway according to claim 1, further comprising a storage part, wherein the storage part stores:

a program that acquires the first information indicating the position of the first signaling gateway on the path through which the signaling message passes to the destination;

a program that acquires third information regarding processing required by the session to which the signaling message belongs, the third information being included in the signaling message; and a program that, based on the first information indicating the position of the first signaling gateway on the path through which the signaling message passes to the destination, and the third information regarding the processing required by the session to which the signaling message belongs, decides whether to execute the processing required by the session in the first signaling gateway, wherein the control part executes the programs stored in the storage part.

4. The first signaling gateway according to claim 3, wherein the program that decides whether to execute the processing required by the session in the signaling gateway can be added or deleted for the processing required by the session.

5. The first signaling gateway according to claim 1, wherein the extended processing includes recording logs or accounting information.

6. The first signaling gateway according to claim 1, wherein the extended processing is executed by the first signaling gateway in conjunction with the RTP server, the presence server, the web server, or the QoS control server.

7. The first signaling gateway according to claim 1, wherein the signaling message is an INVITE message with conformity to SIP, and the second information is included in the INVITE message.

* * * * *